US011922007B2

(12) United States Patent
Murphy

(10) Patent No.: US 11,922,007 B2
(45) Date of Patent: Mar. 5, 2024

(54) APPARATUS, METHOD AND SYSTEM FOR INPUTTING CHARACTERS TO AN ELECTRONIC DEVICE

(71) Applicant: Michael William Murphy, Bellingham, WA (US)

(72) Inventor: Michael William Murphy, Bellingham, WA (US)

( * ) Notice: Subject to any disclaimer, the term of this patent is extended or adjusted under 35 U.S.C. 154(b) by 0 days.

(21) Appl. No.: 16/691,397

(22) Filed: Nov. 21, 2019

(65) Prior Publication Data

US 2020/0174655 A1    Jun. 4, 2020

Related U.S. Application Data

(60) Provisional application No. 62/773,049, filed on Nov. 29, 2018.

(51) Int. Cl.
  *G06F 3/023*    (2006.01)
  *G06F 3/04883*    (2022.01)
  *G06F 3/04886*    (2022.01)

(52) U.S. Cl.
  CPC ........ *G06F 3/04883* (2013.01); *G06F 3/0236* (2013.01); *G06F 3/04886* (2013.01)

(58) Field of Classification Search
  CPC . G06F 3/0236; G06F 3/04886; G06F 3/04883
  See application file for complete search history.

(56) References Cited

U.S. PATENT DOCUMENTS 4,481,508 A    11/1984 Kamei et al.
4,912,462 A    3/1990 Washizuka et al.
(Continued)

FOREIGN PATENT DOCUMENTS

WO    01/49503 A1    7/2001
WO    2014/006639 A1    1/2014
WO    2014/062525 A1    4/2014

OTHER PUBLICATIONS

Extended European Search Report, dated Feb. 18, 2015, for corresponding European Application No. 11168711.7-1959/2395415, 7 pages.

(Continued)

*Primary Examiner* — Towfiq Elahi
*Assistant Examiner* — Bipin Gyawali
(74) *Attorney, Agent, or Firm* — Daylight Law, P.C.

(57) ABSTRACT

Apparatus, methods and systems are disclosed for interacting with an electronic device, including inputting letters. One embodiment of the apparatus includes buttons and a text output field displayed on a touch-sensitive display screen. Each button is assigned one or more letters. The text output field displays text and tentative letter selection indicators. In one embodiment of the method, the device records button actuations that ambiguously identify letter selections. With each actuation, a tentative letter selection indicator becomes appended to the end of the contents of the text output field. Upon activation of a button such as a spacebar button, or in response to an event such as expiration of a time period, a language algorithm disambiguates the recorded ambiguously identified letter selections and returns a word suggestion. The returned word replaces a sequence of appended tentative letter selection indicators displayed in the text output field.

10 Claims, 18 Drawing Sheets

(56) References Cited

U.S. PATENT DOCUMENTS

| | | | |
|---|---|---|---|
| 5,202,961 A | 4/1993 | Mills et al. | |
| 6,011,542 A | 1/2000 | Durrani et al. | |
| 6,271,835 B1 | 8/2001 | Hoeksma | |
| 6,278,384 B1 | 8/2001 | Ide | |
| 6,292,179 B1 | 9/2001 | Lee | |
| 6,295,052 B1 | 9/2001 | Kato et al. | |
| 6,597,345 B2 | 7/2003 | Hirshberg | |
| 6,799,303 B2 | 9/2004 | Blumberg | |
| 7,088,340 B2 | 8/2006 | Kato | |
| 7,218,249 B2 | 5/2007 | Chadha | |
| 7,256,769 B2 | 8/2007 | Pun et al. | |
| 7,372,454 B2* | 5/2008 | Betts-LaCroix | H01H 13/84 345/168 |
| 7,376,938 B1* | 5/2008 | Van der Hoeven | G06F 8/427 717/136 |
| 7,382,358 B2 | 7/2008 | Kushler et al. | |
| 7,424,683 B2 | 9/2008 | Van Leeuwen | |
| D591,307 S* | 4/2009 | Kristensson | D14/487 |
| 7,555,732 B2 | 6/2009 | Van der Hoeven | |
| 7,721,968 B2 | 5/2010 | Wigdor | |
| 7,793,228 B2 | 9/2010 | Mansfield et al. | |
| 8,011,542 B2 | 9/2011 | Gandy et al. | |
| 8,316,319 B1 | 11/2012 | Patel et al. | |
| 8,416,217 B1 | 4/2013 | Eriksson et al. | |
| 8,423,897 B2* | 4/2013 | Rendahl | G06F 3/04886 715/773 |
| 8,487,877 B2 | 7/2013 | Murphy | |
| 8,576,184 B2 | 11/2013 | Arrasvuori et al. | |
| 8,896,543 B2 | 11/2014 | Ettinger | |
| 9,367,240 B2 | 6/2016 | Buck | |
| 9,971,416 B2 | 5/2018 | Gao et al. | |
| 10,101,905 B1 | 10/2018 | Sivertsen et al. | |
| 10,528,230 B2 | 1/2020 | Sirpal et al. | |
| 2002/0180622 A1 | 12/2002 | Lui et al. | |
| 2003/0023473 A1 | 1/2003 | Guyan et al. | |
| 2003/0095104 A1 | 5/2003 | Kandogan et al. | |
| 2003/0193478 A1 | 10/2003 | Ng et al. | |
| 2004/0108994 A1* | 6/2004 | Kato | G06F 3/04886 345/171 |
| 2005/0043949 A1 | 2/2005 | Roth et al. | |
| 2005/0060138 A1 | 3/2005 | Wang et al. | |
| 2005/0270270 A1 | 12/2005 | Chadha | |
| 2006/0019717 A1 | 1/2006 | Gong | |
| 2006/0066583 A1 | 3/2006 | Toutonghi et al. | |
| 2006/0095844 A1 | 5/2006 | Van Leeuwen | |
| 2006/0116135 A1 | 6/2006 | Ure | |
| 2006/0119582 A1 | 6/2006 | Ng et al. | |
| 2006/0202865 A1 | 9/2006 | Nguyen | |
| 2006/0213754 A1 | 9/2006 | Jarrett et al. | |
| 2006/0290536 A1 | 12/2006 | Tzeng | |
| 2007/0040813 A1 | 2/2007 | Kushler et al. | |
| 2008/0075517 A1* | 3/2008 | Vuong | G06F 1/1626 400/486 |
| 2008/0291059 A1 | 11/2008 | Longe | |
| 2008/0316065 A1 | 12/2008 | Maber | |
| 2009/0201252 A1 | 8/2009 | Lee | |
| 2010/0120469 A1 | 5/2010 | Mousseau et al. | |
| 2010/0251161 A1 | 9/2010 | Fong et al. | |
| 2010/0257478 A1 | 10/2010 | Longe et al. | |
| 2010/0271241 A1 | 10/2010 | Weller et al. | |
| 2010/0295789 A1 | 11/2010 | Shin et al. | |
| 2010/0333011 A1 | 12/2010 | Kornev et al. | |
| 2011/0009813 A1 | 1/2011 | Rankers | |
| 2011/0032200 A1 | 2/2011 | Park et al. | |
| 2011/0050576 A1* | 3/2011 | Forutanpour | G06F 3/0488 345/168 |
| 2011/0163973 A1 | 7/2011 | Ording et al. | |
| 2011/0167375 A1 | 7/2011 | Kocienda | |
| 2011/0304483 A1 | 12/2011 | Moon | |
| 2011/0304550 A1 | 12/2011 | Romera Jolliff et al. | |
| 2011/0304555 A1 | 12/2011 | Murphy | |
| 2012/0047453 A1 | 2/2012 | Hale et al. | |
| 2012/0062465 A1* | 3/2012 | Spetalnick | G06F 3/0237 704/9 |
| 2012/0075192 A1 | 3/2012 | Marsden et al. | |
| 2012/0102401 A1 | 4/2012 | Ijas et al. | |
| 2012/0306747 A1 | 12/2012 | Davidson et al. | |
| 2012/0306754 A1 | 12/2012 | Jeong | |
| 2013/0002553 A1* | 1/2013 | Colley | G06F 3/04886 345/161 |
| 2013/0021252 A1 | 1/2013 | Lu et al. | |
| 2013/0021258 A1 | 1/2013 | Salman et al. | |
| 2013/0046544 A1 | 2/2013 | Kay et al. | |
| 2013/0120274 A1 | 5/2013 | Ha et al. | |
| 2013/0187831 A1 | 7/2013 | Sirpal et al. | |
| 2013/0194191 A1 | 8/2013 | Bradford et al. | |
| 2013/0271385 A1* | 10/2013 | Griffin | G06F 3/04883 345/173 |
| 2013/0278506 A1 | 10/2013 | Murphy | |
| 2013/0285913 A1 | 10/2013 | Griffin et al. | |
| 2014/0049477 A1 | 2/2014 | Dai et al. | |
| 2014/0123051 A1 | 5/2014 | Ni | |
| 2014/0173522 A1 | 6/2014 | Murphy | |
| 2014/0181721 A1 | 6/2014 | Buck | |
| 2015/0022455 A1 | 1/2015 | Murphy | |
| 2015/0070281 A1 | 3/2015 | Melmon et al. | |
| 2015/0089432 A1 | 3/2015 | Fallah | |
| 2015/0234592 A1 | 8/2015 | Murphy | |
| 2016/0063036 A1 | 3/2016 | Kawai | |
| 2016/0070441 A1* | 3/2016 | Paek | G06F 3/0483 715/773 |
| 2016/0124535 A1 | 5/2016 | Murphy | |
| 2016/0132233 A1 | 5/2016 | Ghassabian | |
| 2016/0320929 A1 | 11/2016 | Murphy | |
| 2016/0320963 A1 | 11/2016 | Murphy | |
| 2016/0321236 A1 | 11/2016 | Murphy | |
| 2016/0321237 A1 | 11/2016 | Murphy | |
| 2017/0003876 A1* | 1/2017 | Marsden | G06F 3/0231 |
| 2017/0052702 A1 | 2/2017 | Norris, III | |
| 2017/0118383 A1 | 4/2017 | Bollman et al. | |
| 2017/0199661 A1 | 7/2017 | Murphy | |
| 2017/0228152 A1 | 8/2017 | Kim et al. | |

OTHER PUBLICATIONS

International Search Report and Written Opinion, dated Aug. 10, 2016, for corresponding International Application No. PCT/US2016/029614, 11 pages.

International Search Report and Written Opinion, dated Aug. 8, 2016, for corresponding International Application No. PCT/US2016/029611, 10 pages.

International Search Report and Written Opinion, dated May 11, 2016, for corresponding International Application No. PCT/US2015/058654, 11 pages.

International Search Report and Written Opinion, dated Jul. 30, 2018, for corresponding International Application No. PCT/US2018/033542, 8 pages.

Murphy, "An Interleaved Character Selection Interface," U.S. Appl. No. 16/687,225, filed Nov. 18, 2019, 156 pages.

U.S. Appl. No. 14/701,417, filed Apr. 30, 2015, Method of Character Identification That Uses Button Press Types.

U.S. Appl. No. 15/139,858, filed Apr. 27, 2016, Systems and Methods for Word Identification That Use Button Press Type Error Analysis.

U.S. Appl. No. 15/274,577, filed Sep. 23, 2016, Method of Character Selection That Uses Mixed Ambiguous and Unambiguous Character Identification.

U.S. Appl. No. 15/139,862, filed Apr. 27, 2016, Method of Word Identification That Uses Interspersed Time-Independent Selection Keys.

U.S. Appl. No. 15/139,866, filed Apr. 27, 2016, Method and System of Multi-Variable Character Input.

U.S. Appl. No. 16/242,688, filed Jan. 8, 2019, Method and System of Multi-Variable Character Input.

U.S. Appl. No. 15/139,872, filed Apr. 27, 2016, Method of Word Identification That Uses an Array Variable.

(56) References Cited

OTHER PUBLICATIONS

U.S. Appl. No. 16/687,225, filed Nov. 18, 2019, An Interleaved Character Selection Interface.
U.S. Appl. No. 16/687,225, filed Nov. 18, 2019.

* cited by examiner (a)

(b)

(c)

(d)

(e) (f) (g) (h)

| | | | 148 |
|---|---|---|---|
| esual | eoual | etual | |
| esuam | eouam | etuam | |
| esucl | eoucl | etucl | |
| esucm | eoucm | etucm | |
| | | | |
| eswal | eowal | etwal | |
| eswam | eowam | etwam | |
| eswcl | eowcl | etwcl | |
| eswcm | eowcm | etwcm | |

APPARATUS, METHOD AND SYSTEM FOR INPUTTING CHARACTERS TO AN ELECTRONIC DEVICE

TECHNICAL FIELD

This description generally relates to the field of electronic devices and, more particularly, to the interaction of humans and electronic devices.

BRIEF SUMMARY

Electronic devices often accept input data in order to perform their designed function. Such data may include letters, words, sentences, numbers, characters and symbols. If a device accepts input from humans, then the device typically includes a user interface. In many cases, the user interface includes selection buttons that, in some embodiments, are physical buttons (hard buttons), but in other embodiments are virtual buttons (or soft buttons) that appear on an electronic display.

A frequent consideration in the design of electronic devices is size. Designers seek to make devices compact in order to enhance portability and mobility, to maximize the space available for other features, or simply for overall convenience to the user. One example of a device for which size is a consideration is an electronic device (a mobile phone or smartphone). Another example is a wearable device such as a wristwatch or other device that attaches to clothing. Another example is a game platform, whether portable, paired with or connected to a console game. Another example is a remote controller for a TV system. A further example is augmented or virtual reality (AR/VR) systems. Yet another example is the interface of a vehicle, where available dashboard space is limited. All these are examples of electronic devices that may require user input, and for which size is a consideration.

A feature often compromised in pursuit of compactness is the size of selection buttons. Ideally, selection buttons are sized to approximately match the size of the selector, which for many devices is the human finger. But in many applications, overall compactness outweighs ideal button size in importance. In that case, button size becomes compromised for the sake of compactness. One consequence of smaller buttons is inaccurately entered data due to inaccurate button selections. Another consequence is slower typing speeds. Another is an increase in the dexterity needed to operate the device. Yet another consequence is reduced use or avoidance of the electronic device—or particular applications of the electronic device—due to the inconvenience of mobile text input resulting from smaller buttons. The text input interface of many electronic devices is a classic example of this design compromise and the resulting consequences for usability.

FIG. 1 is one embodiment of an electronic device 100. The embodiment of FIG. 1 depicts a mobile communication device.

The electronic device 100 includes a case 102, a touch-sensitive display screen 104 and a "home" button 106. The case holds and mechanically supports the display screen and the "home" button. The screen and "home" button intersect the surface of the case and lie alongside one another on the surface of the case. The screen displays a user input interface 108 and an application program interface 124. In the embodiment of FIG. 1, the application program interface 124 occupies the screen's upper portion, and the input interface 108 occupies the screen's lower portion.

In the embodiment of FIG. 1, the user input interface 108 includes a standard text input interface 110 and a plurality of function buttons 116. The standard text input interface and the plurality of function buttons lie adjacent to one another within the user input interface. The standard text input interface 110 is made up of a plurality of standard letter selection buttons 118 arranged in rows. Each standard letter selection button 118 selects one letter upon actuation. The plurality of function buttons includes a "Space" button 117.

In the embodiment of FIG. 1, the application program interface 124 includes a text output field 130. The text output field is filled with text 138. The text 138 includes a word-under-edit 142 at the right-hand end of the bottom row of the text 138. In a further embodiment, a user can exchange the application program interface 124 for the interface of another application program stored on the device 100. In the embodiment of FIG. 1, the application interface 124 connects with an application program that displays and stores text, for example a mobile note-taking application.

FIG. 2 is another embodiment of the electronic device 100. The embodiment of FIG. 2 also depicts a mobile communication device.

The electronic device 100 includes the case 102, the touch-sensitive display screen 104 and the "home" button 106. The case holds and mechanically supports the display screen and the "home" button. The screen and "home" button intersect the surface of the case and lie alongside one another on the surface of the case. The screen displays the user input interface 108 and the application program interface 124. In the embodiment of FIG. 2, the application program interface 124 occupies the screen's upper portion, and the input interface 108 occupies the screen's lower portion.

In the embodiment of FIG. 2, the user input interface 108 includes the standard text input interface 110 and the plurality of function buttons 116. The standard text input interface and the plurality of function buttons lie adjacent to one another within the user input interface. The standard text input interface 110 is made up of a plurality of standard letter selection buttons 118 arranged in rows. Each standard letter selection button 118 selects one letter upon actuation. The plurality of function buttons includes a "Space" button 117.

In the embodiment of FIG. 2, the application program interface 124 includes the text output field 130. The text output field is filled with text 138. The text 138 includes the word-under-edit 142 at the right-hand end of the bottom row of the text 138. In a further embodiment, a user can exchange the application program interface 124 for the interface of another application program stored on the device 100. In the embodiment of FIG. 2, the application interface 124 connects with an application program that enables a user to transmit and receive text messages to users of other electronic devices via a communication network. Examples of such an application program are Apple iMessage and WhatsApp.

Mobile text input is notoriously slow, inaccurate and inconvenient. The invention disclosed improves the speed, ease and accuracy of text input by making selection buttons bigger. In one embodiment, the invention is an improved computer-processor implemented apparatus and method.

In one embodiment, the apparatus includes touch-sensitive selection buttons of two different kinds. In a further embodiment, the two kinds of buttons are distinguished by the input selection gesture that actuates them. In a further embodiment, selection buttons of a first kind are actuated by a button tap. In still a further embodiment, selection buttons of a second kind are actuated by a selection gesture that is unique from a button tap. In still a further embodiment, the unique gesture that actuates the second kind is a tap-and-swipe gesture.

In one embodiment, buttons of the first kind are assigned a letter pair, and buttons of the second kind are assigned one letter. In a further embodiment, a mark identifies the letters of one kind of button, so a user can associate those letters with the gesture that selects the button of those letters. In a further embodiment, the mark is a rectangle that surrounds each letter of the buttons of the second kind.

Buttons of the interface are arranged in rows. In one embodiment, within a row, buttons are arranged according to two conditions: (1) no letters of the same kind of button are adjacent to one another unless the letters are assigned to the same button, and (2) adjacent letters are either assigned to different but overlapping buttons, or to the same button.

In another embodiment, both kinds of buttons are nominally rectangular and are the same size and shape. In a further embodiment, the buttons of the first kind are arranged in a row, one button adjacent to the next along the row. Buttons of the second kind are arranged in a row, one button adjacent to the next along the row, as well. In a further embodiment, the rows of buttons overlap collinearly and are offset collinearly from one another by 50% of the button width.

In one embodiment, the apparatus includes a text output field on a display screen of an electronic device. In one embodiment, actuation of the buttons of the interface produces output in the text output field of the display. In a further embodiment, the result of a button actuation is display of a tentative letter selection (TLS) indicator (also called a generic actuation indicator) in the text output field. In one embodiment, the TLS indicator is a dot. In one embodiment, the TLS indicator serves as a temporary placeholder in the txt output field for an ambiguous letter selection.

In a further embodiment, the processor of the electronic device includes an actuation interpreter and a received sequence disambiguator. In one embodiment, the actuation interpreter is configured to build a unit string in response to a button actuation, and to assemble the unit strings into sequences. In a further embodiment, the received sequence disambiguator is configured to convert a sequence of unit strings to one or more word suggestions. In still a further embodiment, a graphics engine is configured to replace a sequence of TLS indicators displayed in the text output field with a word suggestion from the received sequence disambiguator.

According to one embodiment of the method, in response to a button actuation, the actuation interpreter builds and records a first unit string, as one non-limiting example, according to the process described in and shown in FIG. 53 of International Patent Application No. PCT/US18/33542, filed May 18, 2018, entitled "AN INTERLEAVED CHARACTER SELECTION INTERFACE", which is hereby incorporated by reference herein in its entirety. Furthermore, the graphics engine displays a first TLS indicator in the text output field of the display. In response to a subsequent button actuation, the actuation interpreter records a second unit string and appends the second unit string to the first unit string to form a sequence, as one non-limiting example, according to the process described in and shown in FIG. 53 of International Patent Application No. PCT/US18/33542). Furthermore, the graphics engine displays a second TLS indicator in the text output field, in one embodiment appending the second TLS indicator to the first TLS indicator to make a sequence. In response to subsequent button actuations, the actuation interpreter appends additional unit strings to the recorded sequence of unit strings, as one non-limiting example, according to the process described in and shown in FIG. 53 of International Patent Application No. PCT/US18/33542) and the graphics engine appends additional TLS indicators to the displayed sequence of TLS indicators in the text output field.

In response to actuation of the disambiguation button, which in one embodiment is the actuation of a "Space" or spacebar button, the received sequence disambiguator disambiguates the recorded sequence of unit strings and returns one or more word suggestions, as one non-limiting example, according to the process described in and shown in FIGS. 53 and 38 of International Patent Application No. PCT/US18/33542. In a further embodiment, the graphics engine replaces the sequence of TLS indicators displayed in the text output field with one of the word suggestions.

In one example embodiment of an application of the method and apparatus, a user interacts with the interface using a gesture that actuates only one of the two kinds of buttons. As a consequence of using a gesture that actuates just one kind of button, the letters of the other kind of button are not selectable.

In one example embodiment of a more specific application, the only gesture a user uses is a tap actuation. As a consequence of using just a tap actuation, the letters selected with a unique selection gesture are not selectable.

In one example embodiment of still a more specific application, the tap actuation actuates the first kind of button. As a consequence of using just a tap actuation, the letters of the second kind of button are not selectable. So the letters of the first kind of button are selectable, and the letters of the second of button are not selectable.

In one example embodiment of a further application of the method and apparatus, actuation of a disambiguation button returns one or more word suggestions. Any of the one or more word suggestions may include letters of either the first or second kind of buttons. In one example embodiment of still a further application, the graphics engine replaces a sequence of TLS indicators displayed in the text output field as a result of the button actuation with the returned word. In one example embodiment of yet a further application, the graphics engine replaces each displayed TLS indicator with a letter of the returned word. In one example embodiment of the application of the method and apparatus, the returned word includes letters assigned to the second kind of button. As a result, the output of the text output field includes the letters of the second kind of button, even though those letters are not selectable by a tap actuation.

In a further embodiment of the method and apparatus, in identifying word suggestions, in one non-limiting example, according to the process described in and shown in FIGS. 54 and 38 of International Patent Application No. PCT/US18/33542,) the received sequence disambiguator simultaneously: (1) inserts the letters of the second kind of button, and (2) disambiguates the letter pairs of the selections of the first kind of button, each on an as-needed basis, to produce word suggestions.

In one example embodiment of an application of the apparatus and method where the buttons of the first kind are tap actuated, but the buttons of the second kind are not, all letters of the interface—even the letters of the buttons of the second kind—appear to a user to be selectable using tap selections. A combination of two aspects of the disclosure produce that effect: (1) tentative letter selection (TLS) indicators that temporarily disguise the fact that letter selections are ambiguous, and (2) algorithmic correction, in one non-limiting example, according to the process described in and shown in FIGS. 54 and 38 of International Patent Application No. PCT/US18/33542, that inserts the letters of the buttons of the second kind, as needed. The effect gives a user the illusion that they can select any letter of the interface with a tap actuation, even though the letters of the buttons of the second kind are not being selected by actuation.

The effect is particularly valuable for text input interfaces where the selection button size is less than the size of the selector, such as text input interfaces on electronic devices where buttons are actuated with a user's fingers or thumbs. But the effect is equally applicable to any interface that is crowded and that requires selection of letters or characters. Particularly useful applications are the compact user interfaces of wearable devices, watches, industrial equipment interfaces, electronic devices, games, game controllers, TV remote controllers, augmented and virtual reality interfaces, and others.

In one embodiment, "buttons of the first kind" are primary buttons, and "buttons of the second kind" are interleaved buttons.

One computer processor-implemented embodiment of the apparatus includes at least one computer processor and at least one non-transitory computer memory coupled to the at least one processor, the at least one non-transitory computer memory having computer-executable instructions stored thereon that, when executed by the at least one processor, cause the at least one processor to generate an interactive graphical user interface that includes two or more buttons arranged in a row of buttons on the interactive graphical user interface, each button of the two or more buttons assigned at least one letter, and the text output field on the interactive graphical user interface.

In a further embodiment, the processor also records actuations of the two or more buttons, displays the generic actuation indicator in the text output field in response to each recorded actuation, and replaces the sequence of one or more displayed generic actuation indicators with the word that corresponds to the assigned at least one letter of the recorded actuated buttons.

In still a further embodiment, the interactive graphical user interface further includes one or more interleaved buttons collinear with and overlapping the row of buttons, each of the one or more interleaved buttons assigned a letter. In yet a further embodiment, each letter of the interleaved buttons separates the at least one letter assigned to adjacent buttons of the row.

In still a further embodiment, the interactive graphical user interface displays the row of buttons and collinear interleaved buttons twice.

One computer processor-implemented embodiment of the method records actuations of buttons that ambiguously specify letter selections, displays the generic actuation indicator (also called the TLS indicator) on the display screen in response to each recorded actuation, identifies the word according to letter assignments of the actuated buttons and the order in which the actuations occur, and replaces the sequence of one or more displayed generic actuation indicators with the identified word.

A further embodiment of the method identifies the word by specifying one letter of the letter pair assigned to one or more of the actuated buttons.

Another embodiment of the method identifies the word by incorporating letters assigned to unactuated buttons (also called interleaved buttons) into the identified word. In a further embodiment, the actuated buttons (also called primary buttons) are actuatable by a first selection gesture, and the buttons assigned the incorporated letters are actuatable by a second selection gesture different from the first selection gesture. In still a further embodiment, the buttons actuatable by the first selection gesture and the buttons actuatable by the second selection gesture overlap. In yet a further embodiment, the first selection gesture is a tap actuation. In still a further embodiment, the second selection gesture is a unique selection gesture. In yet a further embodiment, the unique selection gesture is a tap-and-swipe gesture.

In another embodiment of the method, the processor identifies the word according to letter assignments of the actuated buttons and the order in which the actuations occur, and replaces the sequence of one or more displayed generic actuation indicators with the identified word in response to a user input. In a further embodiment, the user input is a "Space" button or spacebar actuation.

In yet another embodiment of the method, the processor further appends a space at the end of the identified word displayed on the display screen in response to the user input.

In yet another embodiment of the method, the processor identifies the word according to letter assignments of the actuated buttons and the order in which the actuations occur, replaces the sequence of one or more displayed generic actuation indicators with the identified word, and appends the space at the end of the identified word—all in response to the user input.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

FIG. 6 is a plurality of words that could be output by one embodiment of the electronic device.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems, including client and server computing systems, as well as networks, including various types of telecommunications networks, have not been shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only, and do not interpret the scope or meaning of the embodiments.

Various embodiments are described herein that provide apparatus and systems for inputting characters to an electronic device or a digital network. Furthermore, various embodiments are described herein that provide methods for inputting characters to an electronic device or digital network. Furthermore, various embodiments are described herein that disclose a novel apparatus, method, and system for a human and an electronic device to interact.

Figure 1:
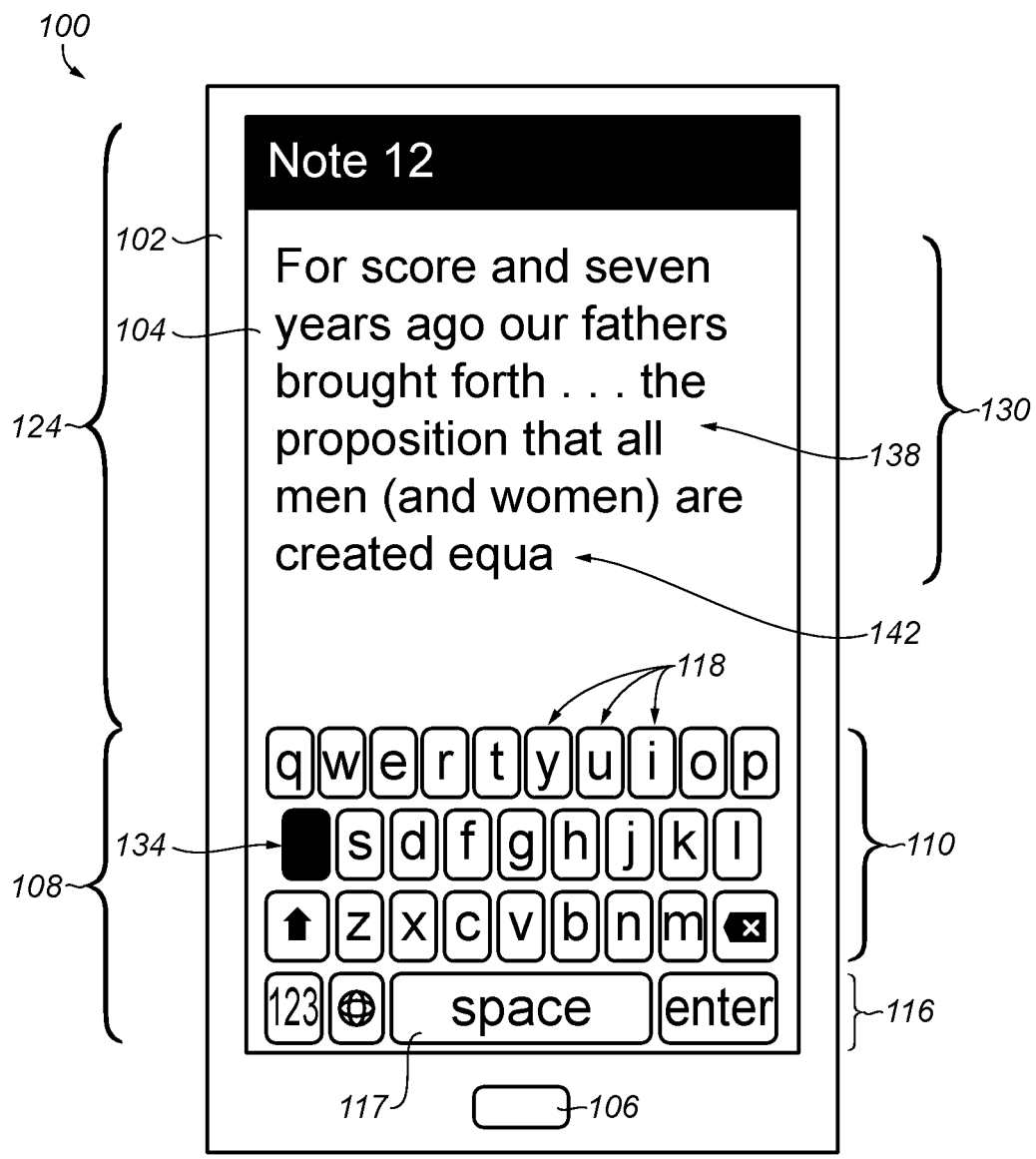
FIG. 1 is a schematic drawing of one embodiment of an electronic device.
Figure 2:
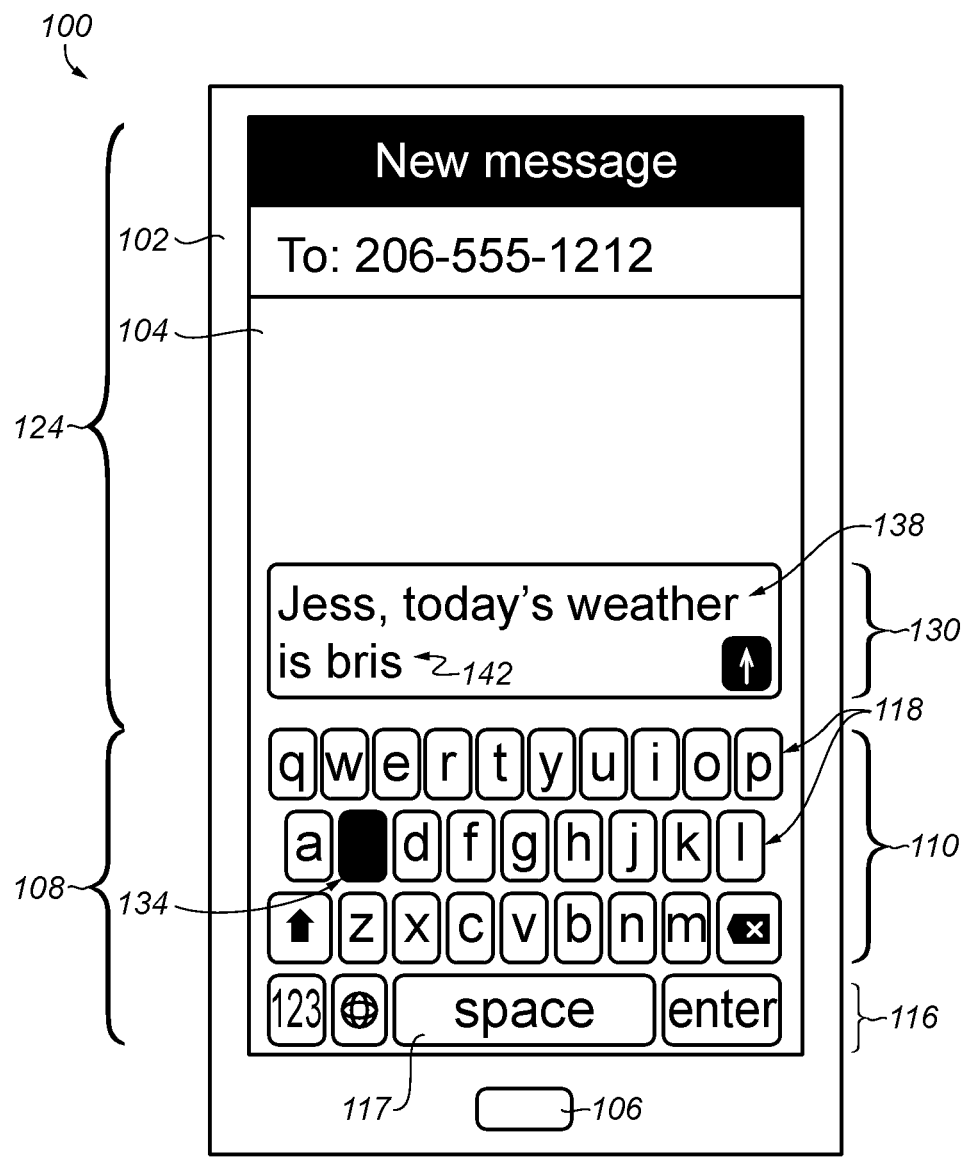
FIG. 2 is a schematic drawing of another embodiment of the electronic device
Figure 3:
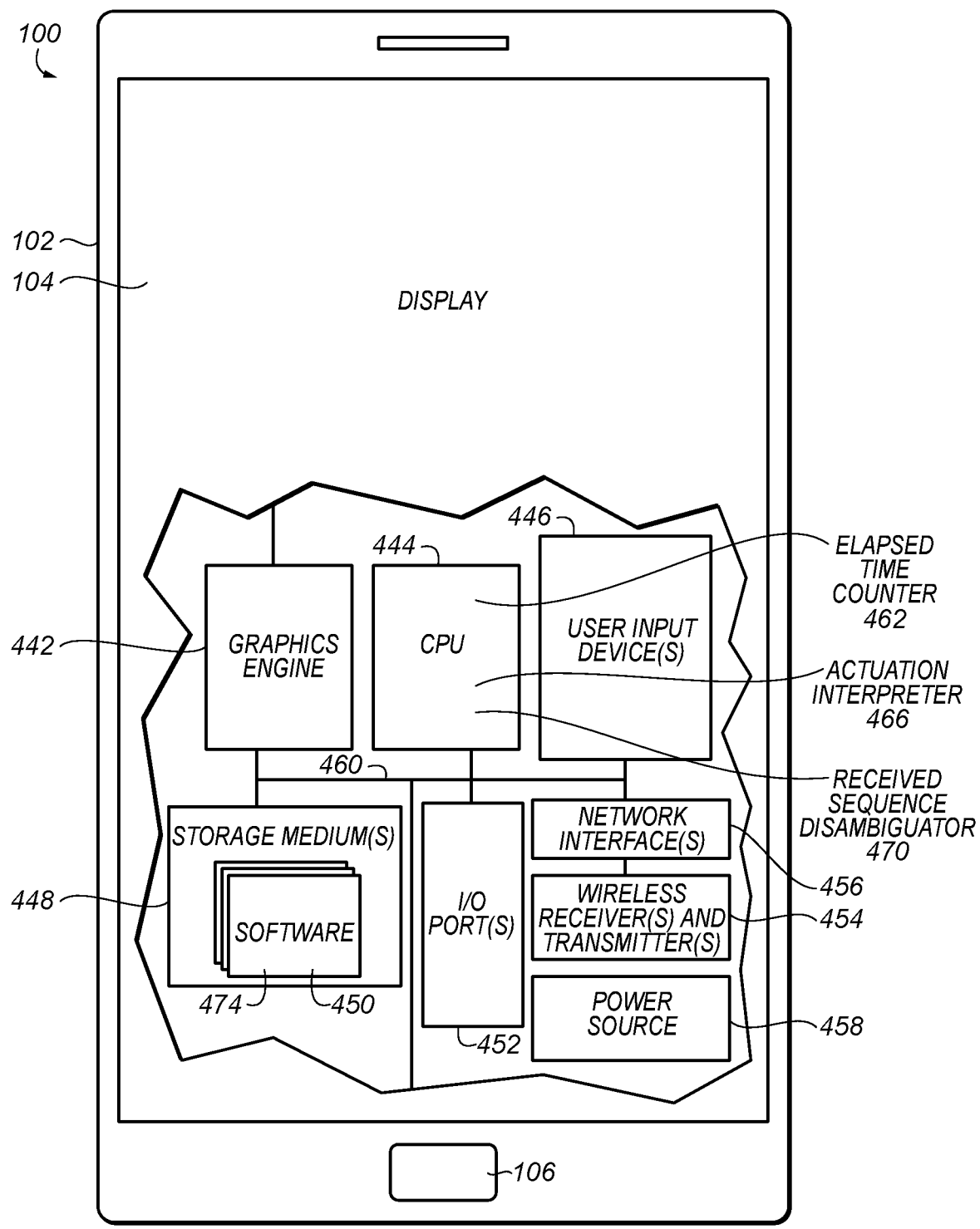
FIG. 3 is a schematic view of an example electronic device with an apparatus for inputting characters according to one illustrated embodiment, the electronic device being an electronic device having a case, a display, a "home" button, a graphics engine, a central processing unit (CPU), user input device(s), one or more storage mediums having various software modules or application programs thereon that are executable by the CPU, input/output (I/O) port(s), network interface(s), wireless receiver(s) and transmitter(s), a power source, an elapsed time counter, an actuation interpreter, and a received sequence disambiguator.

FIG. 3 is a schematic view of one example electronic device 100, in this case a mobile device, that implements a system, method and apparatus for inputting characters according to one illustrated embodiment. The electronic device 100 shown in FIG. 3 may have the case 102, the display 104, the "home" button 106, a graphics engine 442, a central processing unit (CPU) 444, one or more user input devices 446, one or more storage mediums 448 having various software modules 450 and/or application programs 474 stored thereon comprising instructions that are executable by the CPU, input/output (I/O) port(s) 452, one or more wireless receivers and transmitters 454, one or more network interfaces 456, and a power source 458. In some embodiments, some or all of the same, similar or equivalent structure and functionality of the electronic device 100 shown in FIG. 3 and described herein may be that of, part of, or operably connected to a communication and/or computing system of another device or machine.

The electronic device 100 may be any of a variety of devices such as a mobile device, a cellular telephone, a smartphone, a wearable device, a wristwatch, a portable media player (PMP), a personal digital assistant (PDA), a mobile communications device, a portable computer with built-in or add-on cellular communications, a portable game, a game controller or console, a global positioning system (GPS), a handheld industrial electronic device, a television, an automotive interface, an augmented reality (AR) device, a virtual reality (VR) device or the like, or any combination thereof. The electronic device 100 has at least one central processing unit (CPU) 444 which may be a scalar processor, a digital signal processor (DSP), a reduced instruction set (RISC) processor, or any other suitable processor. The central processing unit (CPU) 444, display 104, graphics engine 442, one or more user input devices 446, one or more storage mediums 448, input/output (I/O) port(s) 452, one or more wireless receivers and transmitters 454, and one or more network interfaces 456 may all be communicatively connected to each other via a system bus 460. The system bus 460 can employ any suitable bus structures or architectures, including a memory bus with memory controller, a peripheral bus, and/or a local bus.

The electronic device 100 also includes one or more volatile and/or non-volatile storage medium(s) 448. The storage mediums 448 may be comprised of any single or suitable combination of various types of processor-readable storage media, and may store instructions and data acted on by a CPU. For example, a particular collection of software instructions comprising software 450, application programs 474, and/or firmware instructions comprising firmware are executed by CPU 444. The software or firmware instructions generally control many of the operations of the electronic device 100, and a subset of the software and/or firmware instructions may perform functions to operatively configure hardware and other software in the electronic device 100 to provide the initiation, control, and maintenance of applicable computer network and telecommunication links from the electronic device 100 to other devices using the wireless receiver(s) and transmitter(s) 454, network interface(s) 456, and/or I/O ports 452.

The CPU 444 includes an elapsed time counter 462. The elapsed time counter 462 may be implemented using a timer circuit operably connected to or as part of the CPU 444. Alternately some or all of the elapsed time counter 462 may be implemented in computer software as computer executable instructions stored on volatile and/or non-volatile storage medium(s) 448, for example, that when executed by CPU 444 or a processor of a timer circuit, performs the functions of the elapsed time counter 462.

The CPU 444 includes an actuation interpreter 466. Alternately, some or all of the actuation interpreter 466 may be implemented in computer software as computer executable instructions stored on volatile and/or non-volatile storage medium(s) 448, for example, that when executed by the CPU, performs the functions described herein of the actuation interpreter 466. In one embodiment, the actuation interpreter 466 is configured to, among other operations, receive and interpret input from the touch-sensitive display 104. In a further embodiment, the actuation interpreter 466 is configured to, among other operations, execute the method, as one non-limiting example, described in and shown in FIG. 53 of International Patent Application No. PCT/US18/33542.

The CPU 444 includes a received sequence disambiguator 470. Alternately, some or all of the received sequence disambiguator 470 may be implemented in computer software as computer executable instructions stored on volatile and/or non-volatile storage medium(s) 448, for example, that when executed by the CPU, performs the functions described herein of the received sequence disambiguator 470. In one embodiment, the received sequence disambiguator is configured to, among other operations, execute the methods, as one non-limiting example, described in and shown in FIGS. 54 and 38 of International Patent Application No. PCT/US18/33542. In still a further embodiment, the received sequence disambiguator is configured to receive input from the actuation interpreter 466.

By way of example, and not limitation, the storage medium(s) 448 may be processor-readable storage media which may comprise any combination of computer storage media including volatile and nonvolatile, removable and non-removable media implemented in any method or technology for storage of information such as computer readable instructions, data structures, program modules, application programs or other data.

The storage medium(s) 448 may include system memory which includes computer storage media in the form of volatile and/or nonvolatile memory such as read-only memory (ROM) and random access memory (RAM). A basic input/output system (BIOS), containing the basic routines that help to transfer information between elements within electronic device 100, such as during start-up or power-on, is typically stored in ROM. RAM typically contains data and/or program modules that are immediately accessible to and/or presently being operated on by CPU 444. By way of example, and not limitation, FIG. 3 illustrates software modules 450 including an operating system, application programs and other program modules that implement the processes and methods described herein.

The electronic device 100 may also include other removable/non-removable, volatile/nonvolatile computer storage media drives. By way of example only, the storage medium(s) 448 may include a hard disk drive or solid state storage drive that reads from or writes to non-removable, nonvolatile media, an SSD that reads from or writes to a removable, nonvolatile SSD, and/or an optical disk drive that reads from or writes to a removable, nonvolatile optical disk such as a DVD-RW or other optical media. Other removable/non-removable, volatile/nonvolatile computer storage media that can be used in an operating environment of the electronic device 100 include, but are not limited to, flash memory cards, other types of digital versatile disks (DVDs), microdiscs, digital video tape, solid state RAM, solid state ROM, and the like. The storage medium(s) are typically connected to the system bus 460 through a non-removable memory interface. The storage medium(s) 448 discussed above and illustrated in FIG. 3 provide storage of computer readable instructions, data structures, program modules and other data for the electronic device 100. In FIG. 3, for example, a storage medium may store software 450 including an operating system, application programs 474, other program modules, and program data. The storage medium(s) 448 may implement a file system, a flat memory architecture, a database, or any other method or combination capable for storing such information.

A user may enter commands and information into the electronic device 100 through touch-sensitive screen display 104 or the one or more other input device(s) 446 such as a keypad, keyboard, tactile buttons, camera, motion sensor, position sensor, light sensor, biometric data sensor, accelerometer, or a pointing device, commonly referred to as a mouse, trackball or touch pad. Other input devices of the electronic device 100 may include a microphone, joystick, thumbstick, game pad, optical scanner, other sensors, or the like. Furthermore, the touch-sensitive screen display 104 or the one or more other input device(s) 446 may include sensitivity to swipe gestures, such as a user dragging a finger tip across the touch-sensitive screen display 104. The sensitivity to swipe gestures may include sensitivity to direction and/or distance of the swipe gesture. Furthermore, the touch screen sensitive display 104 or the one or more other input device(s) 446 may include sensitivity to the duration of a press or actuation. Furthermore, the touch-sensitive screen display 104 or the one or more other input device(s) 446 may include sensitivity to a tap actuation. These and other input devices are often connected to the CPU 444 through a user input interface that is coupled to the system bus 460, but may be connected by other interface and bus structures, such as a parallel port, serial port, wireless port, game port or a universal serial bus (USB). Generally, a unique software driver stored in software 450 configures each input mechanism to sense user input, and then the software driver provides data points that are acted on by CPU 444 under the direction of other software 450. The display 104 is also connected to the system bus 460 via an interface, such as the graphics engine 442. In addition to the display, the electronic device 100 may also include other peripheral output devices such as speakers, a printer, a projector, an external monitor, etc., which may be connected through one or more analog or digital I/O ports 452, network interface(s) 456 or wireless receiver(s) and transmitter(s) 454. The electronic device 100 may operate in a networked environment using connections to one or more remote computers or devices, such as a remote computer or device.

When used in a LAN or WAN networking environment, the electronic device 100 may be connected via the wireless receiver(s) and transmitter(s) 454 and network interface(s) 456, which may include, for example, cellular receiver(s) and transmitter(s), Wi-Fi receiver(s) and transmitter(s), and associated network interface(s). When used in a WAN networking environment, the electronic device 100 may include a modem or other means as part of the network interface(s) for establishing communications over the WAN, such as the Internet. The wireless receiver(s) and transmitter(s) 454 and the network interface(s) 456 may be communicatively connected to the system bus 460. In a networked environment, program modules depicted relative to the electronic device 100, or portions thereof, may be stored in a remote memory storage device of a remote system. The wireless receiver(s) and transmitter(s) 454 and network interface(s) 456 of the electronic device 100 may be configured to transmit and receive text and image content via such protocols as SMS, 3G, 4G, 5G, CDMA, FDMA, GSM, and other protocols.

The electronic device 100 has a collection of I/O ports 452 and/or short range wireless receiver(s) and transmitter(s) 454 and network interface(s) 456 for passing data over short distances to and from the electronic device 100 or for coupling additional storage to the electronic device 100. For example, serial ports, USB ports, Wi-Fi ports, Bluetooth® ports, IEEE 1394 (i.e., FireWire), and the like can communicatively couple the electronic device 100 to other computing apparatuses. Compact Flash (CF) ports, Secure Digital (SD) ports, and the like can couple a memory device to the electronic device 100 for reading and writing by the CPU 444, or couple the electronic device 100 to other communications interfaces such as Wi-Fi or Bluetooth transmitters/receivers and/or network interfaces.

Electronic device 100 also has a power source 458 (e.g., a battery). The power source 458 may supply energy for all the components of the electronic device 100 that require power when a traditional, wired or wireless power source is unavailable or otherwise not connected. Other various suitable system architectures and designs of the electronic device 100 are contemplated and may be utilized which provide the same, similar or equivalent functionality as those described herein.

It should be understood that the various techniques, components and modules described herein may be implemented in connection with hardware, software and/or firmware or, where appropriate, with a combination of such. Thus, the methods and apparatus of the disclosure, or certain aspects or portions thereof, may take the form of program code (i.e., instructions) embodied in tangible media, such as various solid state memory devices, DVD-RW, RAM, hard drives, flash drives, or any other machine-readable or processor-readable storage medium wherein, when the program code is loaded into and executed by a machine, such as a processor of a computer, vehicle or electronic device, the machine becomes an apparatus for practicing various embodiments. In the case of program code execution on programmable computers, vehicles or electronic devices, such generally includes a processor, a storage medium readable by the processor (including volatile and non-volatile memory and/or storage elements), at least one input device, and at least one output device. One or more programs may implement or utilize the processes described in connection with the disclosure, e.g., through the use of an API, reusable controls, or the like. Such programs are preferably implemented in a high level procedural or object-oriented programming language to communicate with a computer system of electronic device 100. However, the program(s) can be implemented in assembly or machine language, if desired. In any case, the language may be a compiled or interpreted language, and combined with hardware implementations.

Figure 4:
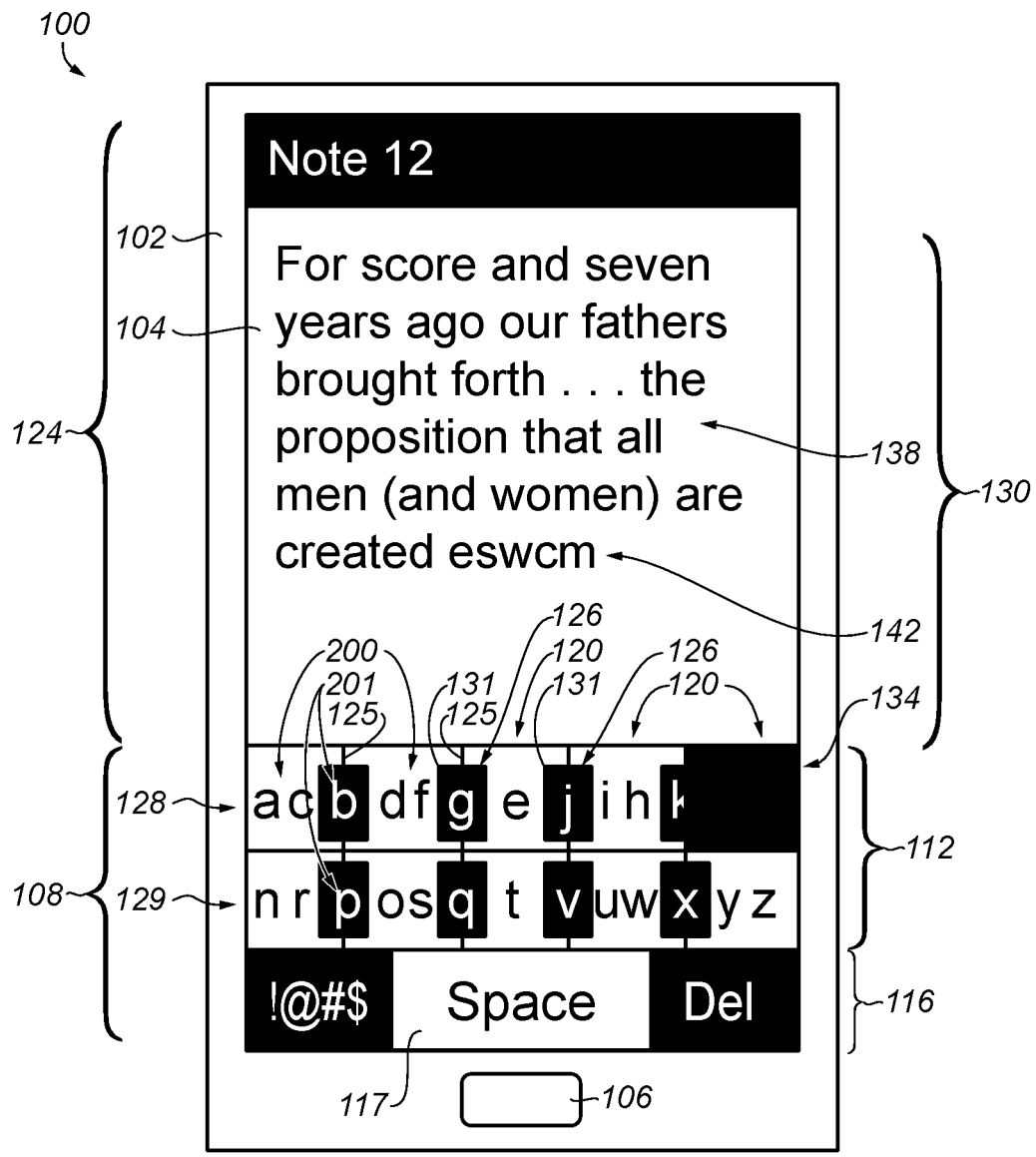
FIG. 4 is a schematic drawing of another embodiment of the electronic device.

FIG. 4 is another embodiment of the electronic device 100. The embodiment depicts a mobile phone or smartphone, but in other embodiments the electronic device could be a wearable device, game, TV controller, augmented/virtual reality system, portion of an automotive dashboard or any number of other electronic devices that require user input.

The electronic device 100 includes the case 102, the touch-sensitive display screen 104 and the "home" button 106. The case holds and mechanically supports the display screen and the "home" button. The screen and "home" button intersect the surface of the case, and lie alongside one another on the surface of the case. The screen displays the user input interface 108 and the application program interface 124. In the embodiment of FIG. 4, the application program interface 124 occupies the screen's upper portion, and the input interface 108 occupies the screen's lower portion.

The user input interface 108 includes an interleaved character selection (ICS) interface 112 and the plurality of function buttons 116. The ICS interface and the plurality of function buttons lie adjacent to one another within the user input interface. The plurality of function buttons includes the "Space" or spacebar button 117.

The application program interface 124 includes the text output field 130. The text output field is filled with text 138. The text includes the word-under-edit 142, which in one embodiment lies at the right-hand end of the bottom line of the text.

The application program interface 124 is communicatively coupled with a corresponding application program 474 stored on the device's storage medium 448. In a further embodiment, a user can change the application program interface 124 shown on the display screen 104 to the interface of one of a plurality of other application programs 474 stored in the storage medium 448 of the device 100.

As an example, the display screen of the embodiment of FIG. 4 shows the application interface 124 of a note-taking application.

In one embodiment of the device 100, the application interface 124 displays characters that a user selects by actuating buttons of the interleaved character selection (ICS) interface 112. As one non-limiting example, International Patent Application No. PCT/US18/33542 provides a detailed description of one embodiment of the ICS interface 112. In particular, International Patent Application No. PCT/US18/33542, FIGS. 16-18, provide a detailed description of an example embodiment of the apparatus of the ICS interface 112. Furthermore, International Patent Application No. PCT/US18/33542, FIGS. 53, 54 and 38, provide a detailed description of an example method for using the ICS interface 112. The ICS interface 112 includes a plurality of primary selection buttons 120 and a plurality of interleaved selection buttons 126. Note that in the embodiment of FIG. 4, the boundaries of the interleaved selection buttons 126 are not explicitly shown, for example, according to one embodiment described in International Patent Application No. PCT/US18/33542, FIGS. 16-18).

In one embodiment, each interleaved selection button 126 includes a selection mark 131. In the embodiment of FIG. 4, the selection mark is a rectangular black box that spans a portion of the area of the mark's respective interleaved selection button 126 and displays a letter 201 that the interleaved button selects, if actuated.

In a further embodiment, each selection mark 131 lies at the center of its respective interleaved button 126. In a further embodiment, the perimeter of each selection mark does not coincide with the boundary of its respective interleaved button, but instead lies entirely inside the boundary of its respective interleaved button. International Patent Application No. PCT/US18/33542, FIGS. 16 and 17, provide further description of one example embodiment of how the interleaved selection buttons 126 and the selection marks 131 may correspond to one another.

In the embodiment of FIG. 4, the buttons 120, 126 are distributed amongst a top row 128 and bottom row 129 of the ICS interface 112. For ease of discussion, the disclosure that follows describes just one button row, but applies to both rows 128, 129 or, in other embodiments, to additional rows.

In the embodiment of FIG. 4, each primary button 120 has an assigned letter pair 200 (except the primary buttons that display the letters "e" and "t", which are exceptions). Furthermore, each interleaved button 126 has one assigned letter 201. In alternative embodiments, the number of letters assigned to each primary and interleaved button could be different than the embodiment of FIG. 4.

In the embodiment of FIG. 4, the primary buttons 120 are rectangular, are distributed uniformly along the row, and lie immediately adjacent to one another within the row. Each primary button 120 has two vertical boundaries 125. For each primary button, its vertical boundaries overlap the nearest vertical boundary of each of said primary button's two adjacent primary buttons, except at the row end.

In a further embodiment, the interleaved buttons 126 are rectangular as well, are also distributed uniformly along the row, and also lie immediately adjacent to one another within the row. (Note—again—that in the embodiment of FIG. 4, the boundary of each interleaved button is not coincident with the perimeter of its selection indicator 131.) In one embodiment, the interleaved buttons 126 have top and bottom edges that coincide with the top and bottom edges of the primary buttons 120 of the row. For each interleaved button, its vertical boundaries overlap the nearest vertical boundary of each of said interleaved button's two adjacent interleaved buttons, except at the row end. In the embodiment of FIG. 4, the vertical boundaries of any given interleaved button intersect the center point of said interleaved button's two overlapping primary buttons.

Said another way, the center of any given primary button 120 lies on the shared boundary of two interleaved buttons 126 that said primary button overlaps. Furthermore, the center of any given interleaved button 126 lies on the shared boundary of two primary buttons 120 that said interleaved button overlaps.

Said yet another way, the primary and interleaved buttons 120,126 are nominally the same size, the same shape, and are distributed at the same interval along the row. Furthermore, the primary and interleaved buttons are collinearly offset from one another along the row by 50% of the button width.

As a result of the size, shape and distribution of the primary buttons, any point within the row of ICS interface 112 is occupied by one of the plurality of primary buttons. Furthermore, as a result of the size, shape and distribution of the interleaved buttons, any point within the row of the ICS interface is occupied by one of the plurality of interleaved buttons, except possibly at the row end. As a consequence, every point within the row is occupied by both one primary and one interleaved button, except possibly at the row ends.

In one embodiment of FIG. 4, the primary buttons 120 are selectable with a tap activation 134 (represented by a black box that superimposes the activated primary button). In a further embodiment, the interleaved buttons 126 are selectable with a unique selection gesture, which is defined as any input actuation except a tap. International Patent Application No. PCT/US18/33542, FIG. 19 or 51, provide a description of example possible unique selection gestures, e.g., a long press or a tap-and-swipe.

As a consequence of the buttons' arrangement (i.e., every point within the row is occupied by one primary and one interleaved button) and, as a consequence of the definition of the input actuations (i.e., every input is a tap or not a tap), an actuation at any point in the row actuates one or the other of the two kinds of buttons (a primary button 120 or an interleaved button 126).

In one example of an application of the embodiment of FIG. 4, a user interacts with the ICS interface 112 using purely tap actuations. Given that unique selection gestures are defined as any actuation except taps, in such an application the interleaved buttons 126 may be effectively immune to actuation. As a consequence, in such an application, the letters 201 assigned to the interleaved buttons may be unselectable.

In a further example application of the embodiment of FIG. 4, input received by the ICS interface 112 may be acquired and edited according to the algorithmic correction methods disclosed in International Patent Application No. PCT/US18/33542, FIGS. 53, 54 and 38. The example methods of International Patent Application No. PCT/US18/33542, FIGS. 53, 54 and 38, return a word suggestion that is a minimum (or near minimum) number of letter edits from an acquired sequence of ambiguous candidate letter selections. In a further application of the embodiment of FIG. 4, the processor 444 may replace the word-under-edit 142 of the text 138 with the word suggestion returned by the example methods of International Patent Application No. PCT/US18/33542, FIGS. 53, 54 and 38.

Of note is that the methods of International Patent Application No. PCT/US18/33542, FIGS. 53, 54 and 38 include the possibility of returning a word suggestion that contains the letters 201 assigned to the interleaved buttons 126.

In another application of the embodiment of FIG. 4, the ICS interface 112 receives input that is tap actuations only. As such, the letters 201 of the interleaved buttons 126 are not selectable. In a further application of the embodiment of FIG. 4, the input received by the ICS interface 112 may be acquired and edited according to the algorithmic correction methods disclosed in International Patent Application No. PCT/US18/33542, FIGS. 53, 54 and 38. Furthermore, the processor 444 replaces the word-under-edit 142 with the word suggestion returned by the correction algorithm. In one example embodiment of the application, the word suggestion includes one or more letters 201 assigned to the interleaved buttons 126. As a result, the letters 201 of the interleaved buttons 126 appear tap selectable to a user due to the fact that the letters 201 occur in the returned word that replaces the word-under-edit 142, even though those letters 201 are not selectable from the ICS interface 112 in the application where the user uses tap actuations only.

In a further embodiment, the least frequently used letters of the alphabet are assigned to the interleaved buttons 126. The embodiment of FIG. 4 enables English-language input, but, in alternative embodiments, the ICS interface 112 could enable input of letters of other languages.

Figure 5A:
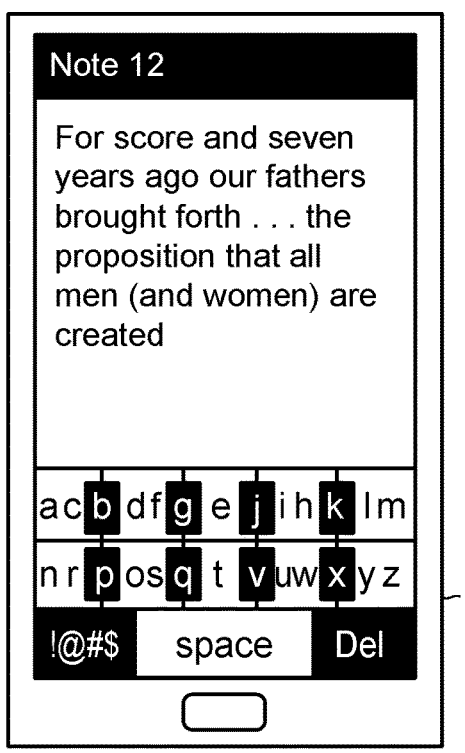
FIGS. 5A and 5B are a progression of views of one embodiment of the electronic device.
Figure 5A:
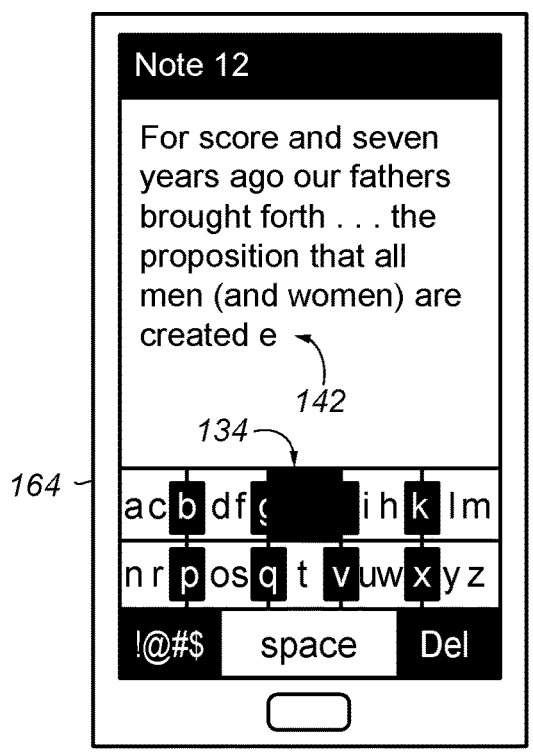
Figure 5A:
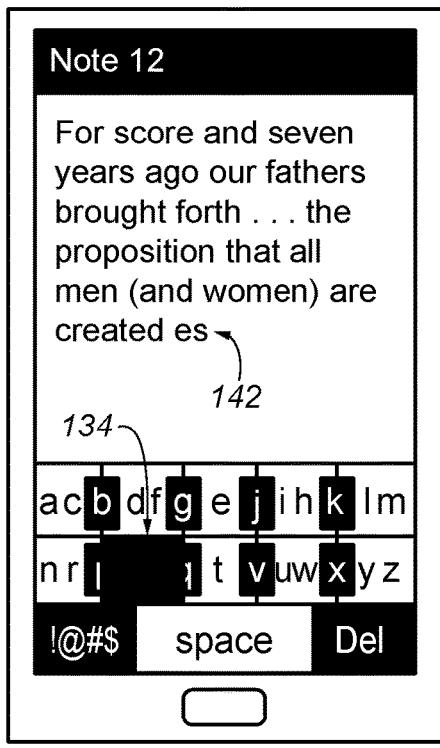
Figure 5A:
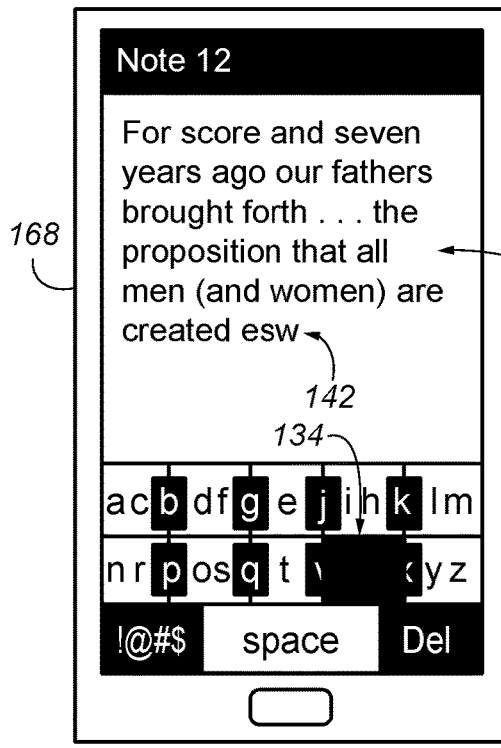
Figure 5B:
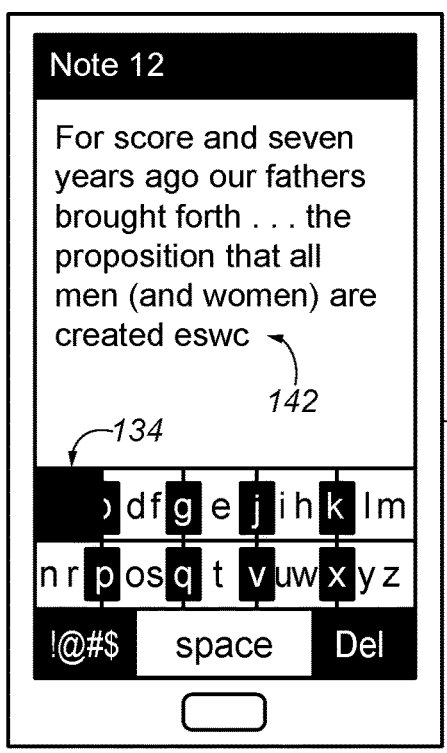
Figure 5B:
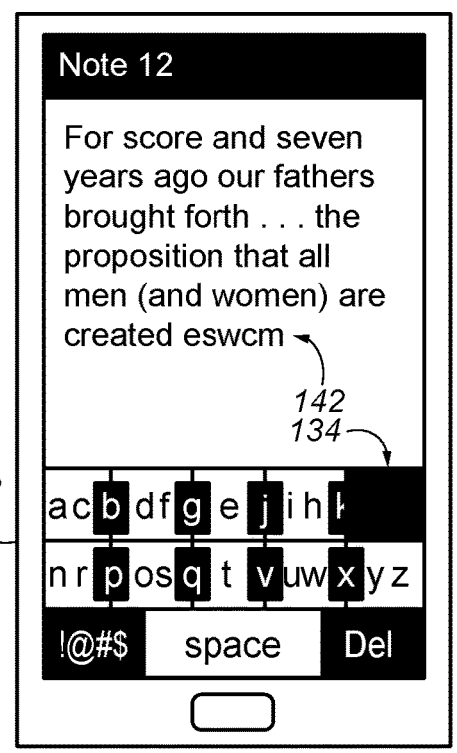
Figure 5B:
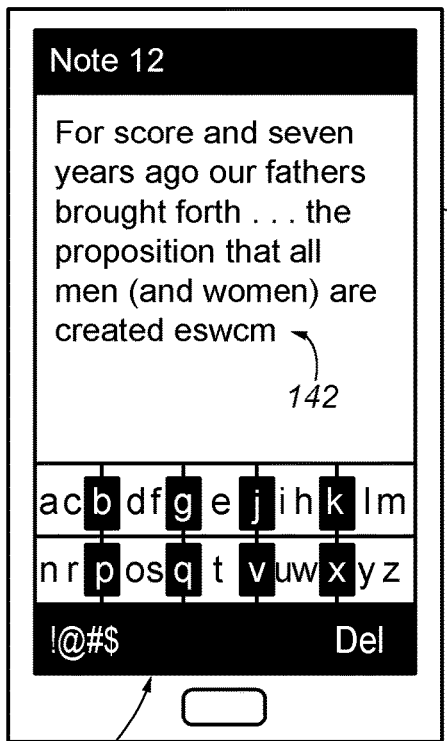
Figure 5B:
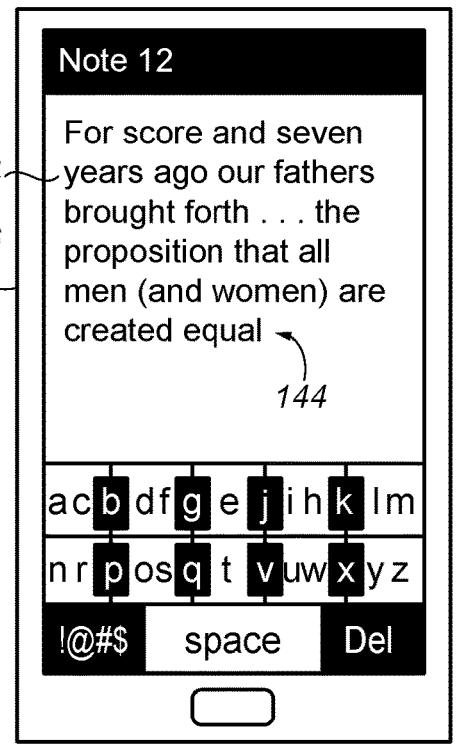

FIGS. 5A and 5B show a progression of views 160 of the device 100 of the embodiment of FIG. 4. Each view shows one in a series of steps whereby the letters of an example word become selected using the ICS interface 112 and displayed as output on the application interface 124. The progression uses the example word "equal", but clearly input of words other than "equal" are not outside the scope of the disclosure.

Note that conversion of the selections of the ICS interface 112 to the displayed output may include building a unit string and appending the unit string to a received sequence variable, according to the example method described in and shown in FIG. 53 of International Patent Application No. PCT/US18/33542. For the sake of clarity, according to one embodiment, it is understood that each button actuation 134 may trigger the steps of the method described in International Patent Application No. PCT/US18/33542, FIG. 53.

Note that in the example of FIGS. 5A and 5B, the primary buttons are actuated with taps, and the interleaved buttons with unique selection gestures, as described in the embodiment of FIG. 4.

In a first view 162 of the progression 160, no word-under-edit is evident. In a second view 164 of the progression, the actuation 134 of the primary button that is assigned the letter "e" occurs. As a result, the word-under-edit 142 displays the letter "e".

In a third view 166 of the progression, the actuation 134 of the primary button that is assigned the letter "o s" occurs. As a result, the word-under-edit 142 displays the letter "es". In an alternative embodiment, a user—who for this actuation intends to select the letter "q"—could have actuated the primary button assigned the letter "t".

In a fourth view 168 of the progression, the actuation 134 of the primary button that is assigned the letter "u w" occurs. As a result, the word-under-edit 142 displays the letter "esw". Because the actuated button is assigned a letter pair, the actuation interpreter 466 must choose which of the two letters to display. In one embodiment, the interpreter chooses to display the letter on the button-half on which the tap actuation lands. In an alternative embodiment, the interpreter executes a character-level language model and chooses the most likely intended letter based on previous actuations in the word-under-edit 142. In still another embodiment, the interpreter 466 picks a letter from the letter pair at random. In a fifth view 170 of the progression, the actuation 134 of the primary button that is assigned the letter "a c" occurs. As a result, the word-under-edit 142 displays the letter "eswc". In a sixth view 172 of the progression 160, the actuation 134 of the primary button that is assigned the letter "l m" occurs. As a result, the word-under-edit 142 displays the letter "eswcm".

In a seventh view 174 of the progression, a "Space" actuation 136 occurs (represented by a black box that covers the "Space" button 117). In one embodiment of the progression 160, the "Space" actuation triggers 136 the received sequence disambiguator 470 to disambiguate the sequence of unit strings stored in the received sequence variable, in one non-limiting example, according to the process described in and shown in FIGS. 54 and 38 of International Patent Application No. PCT/US18/33542. In an alternative embodiment, an actuation of a button other than the "Space" actuation triggers the received sequence disambiguator 470 to disambiguate. In yet another embodiment, the device 100 itself triggers the received sequence disambiguator 470 to disambiguate, in response to an event or expiration of a pre-determined elapsed time period.

In an eighth view 176 of the progression, the received sequence disambiguator 470 returns the word suggestion. In a further embodiment, the graphics engine 442 updates the display 104 by replacing the word-under-edit 142 with the word suggestion 144. For the example of FIGS. 5A and 5B, the word suggestion 144 is "equal".

Although the progression of views of FIGS. 5A and 5B is one embodiment of steps for inputting characters using the embodiment of the device 100 of FIG. 4, the scope of the method is not limited by this particular example or particular embodiment, but rather by the scope of the claims.

FIG. 6 shows possible alternatives 148 for the word-under-edit 142 at the final primary button actuation (at view 174) for the example word "equal" for the embodiment of the apparatus of FIG. 4 and the progression of views 160 of FIGS. 5A and 5B.

Multiple alternatives for the word-under-edit are possible due to the ambiguity of button actuations. For each selection, the letter displayed could be decided based on the particular button-half actuated, by a character-level language model, or by random choice, as disclosed in the instance of the fourth view 168 of FIGS. 5A and 5B. The number of possible alternatives 148 multiplies with each letter selection.

Note that none of the possible alternatives include letters that are assigned to the interleaved buttons 126. That condition occurs in an application that uses purely tap actuations, and where the interleaved buttons are actuated with a unique selection gesture that is defined as any input gesture except a tap.

The fact that the word-under-edit 142 could display alternatives is problematic. Users typically execute button actuations with the expectation that each letter output, and consequently the entire word, matches their intended selections. If a user executes all or part of the letter selections that make up an intended word, but the word-under-edit does not match the letters they intend (such as "eswcm" in the progression of FIGS. 5A and 5B), then the user may proceed to delete the letters of the word-under-edit 142 because the user falsely concludes they made a typing mistake. That may happen even though the algorithmic correction methods of International Patent Application No. PCT/US18/33542, FIGS. 54 and 38, would have successfully corrected the word-under-edit to their intended word, if the user actuated the disambiguation button.

Figure 7:
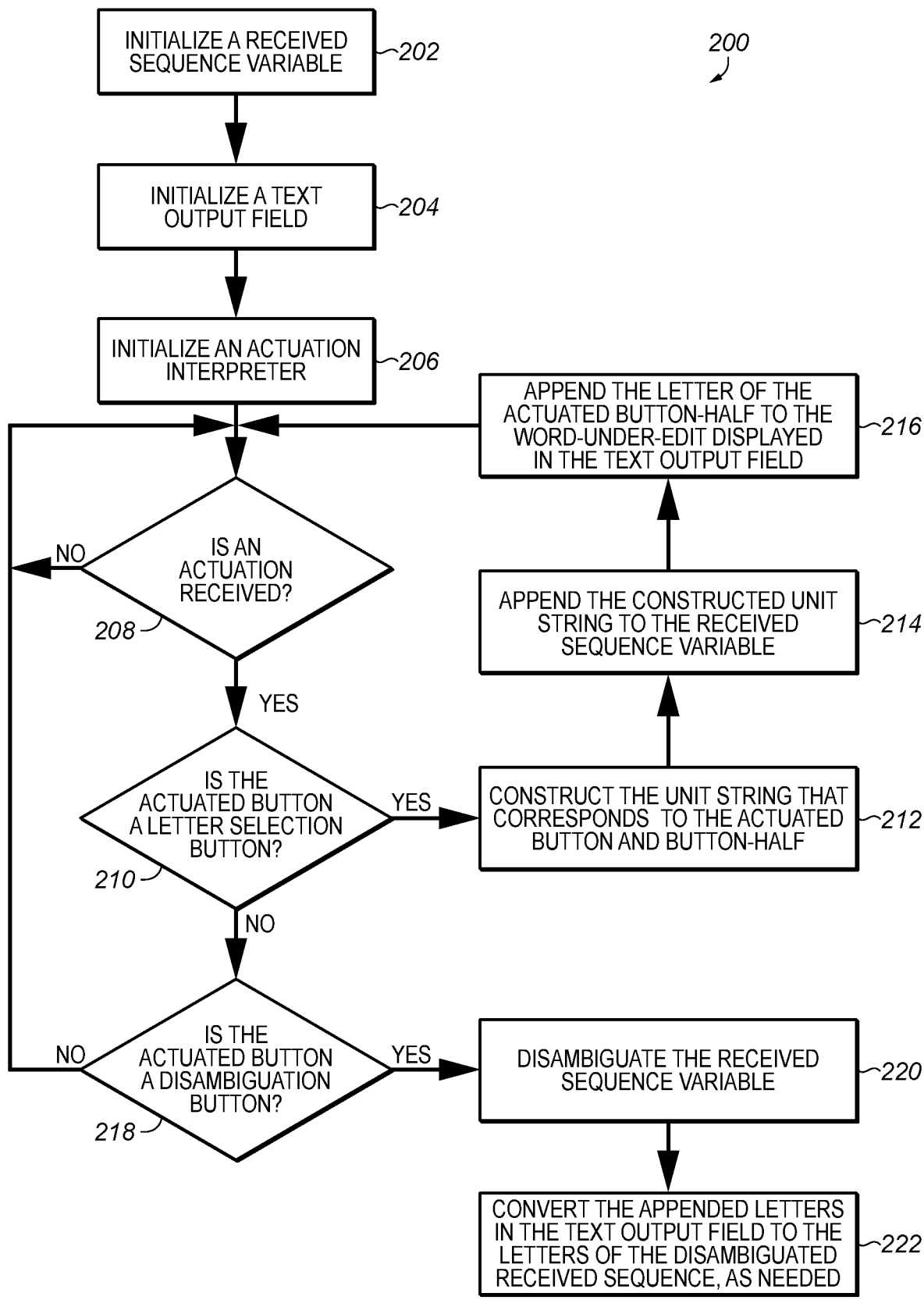
FIG. 7 is a flowchart of one embodiment of a method for a processor of an electronic device to interpret character selections.

FIG. 7 shows a flowchart of an embodiment of a method 200 for the processor 444 of the electronic device 100 to interpret character selections.

In a step 202 of the method 200, the processor 444 initializes a received sequence variable. In a step 204 of method 200, the processor 444 initializes the text output field 130. In a step 206, the processor 444 initializes the actuation interpreter 466. In a step 208, the processor monitors the ICS interface 112 for a button actuation. Once a first actuation occurs, in a step 210, the actuation interpreter 466 determines if the button actuated is one of the letter selection buttons.

If in the step 210 the actuation interpreter 466 determines the button actuated is one of the letter selection buttons, in subsequent steps 212 and 214 the actuation interpreter constructs the unit string that corresponds to the actuated button and button-half, and appends the constructed unit string to the received sequence variable, in one non-limiting example, according to the method of International Patent Application No. PCT/US18/33542, FIG. 53. Furthermore, in a subsequent step 216, the processor 444 appends the letter of the actuated button-half to the word-under-edit 142 displayed in the text output field 130.

If in the step 210 the actuation interpreter 466 determines the button actuated is not one of the letter selection buttons, in a subsequent step 218 the actuation interpreter determines if the button actuated is the disambiguation button. In one embodiment, the disambiguation button is the "Space" button.

If in the step 218, the actuation interpreter determines the button actuated is not the disambiguation button, the actuation may not have been related to a letter selection, and is disregarded.

If in the step 218, the actuation interpreter determines the button actuated is the disambiguation button (which in one embodiment is the "Space" button), in a step 220 the received sequence disambiguator 470 disambiguates the sequence of appended unit strings stored in the received sequence variable, in one non-limiting example, according to the method of International Patent Application No. PCT/US18/33542, FIGS. 54 and 38. Furthermore, in a final step 222, the processor 444 replaces the letters of the wordunder-edit 142 in the text output field 130 with the letters of the disambiguated received sequence yielded by the step 220, as needed.

According to a further embodiment of the invention, the processor 444 executes the method 200 iteratively. Although the method 200 of FIG. 7 is one embodiment of a method for interpreting words from actuations of buttons of the ICS interface 112, the scope of the method is not limited by this particular embodiment, but rather by the scope of the claims.

Figure 8:
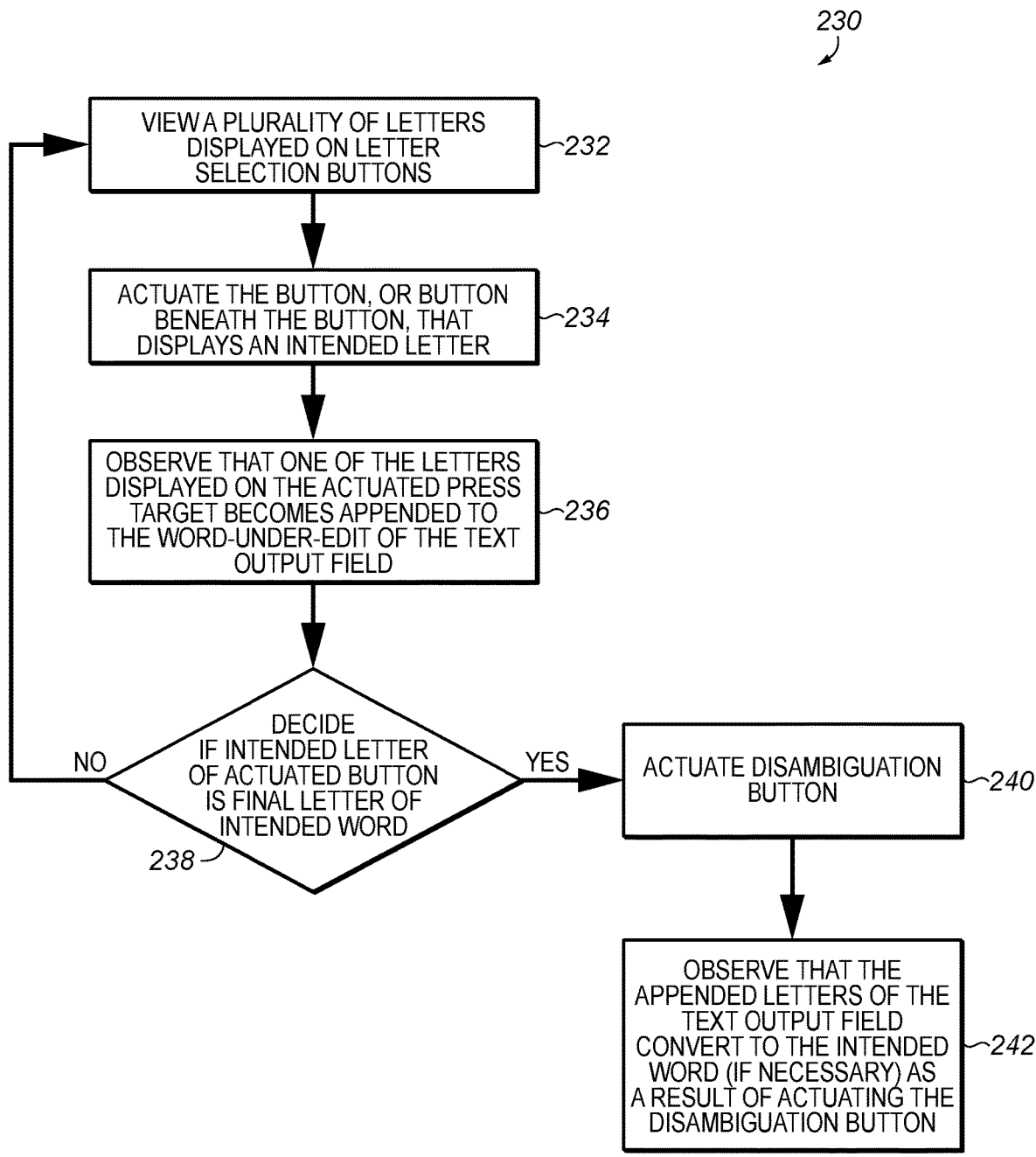
FIG. 8 is a flowchart of one embodiment of a method for a user to input characters to an embodiment of the electronic device.

FIG. 8 shows a flowchart of an embodiment of a method 230 for a user to input characters to the electronic device 100.

In a step 232 of the method 230, a user views the characters of the ICS interface 112. In a step 234, the user actuates the button that displays the intended character or the button beneath the button that displays the intended character.

In a step 236, the user observes that one of the letters displayed on the actuated button becomes appended to the word-under-edit 142 of the text output field 130.

In a step 238, the user decides if the intended letter of the actuated button is the final letter of the user's intended word. If the intended letter of the actuated button is not the final letter of the user's intended word, then in the step 232 the user views the characters of the ICS interface in search of the next intended letter, and repeats the steps of the method 230.

If in the step 238 the user decides the intended letter of the actuated button is the final letter of the user's intended word, then in a step 240 the user actuates the disambiguation button, which in one embodiment is the "Space" button of the user input interface 108. In a final step 242 of the method 230, the user observes that the letters of the word-under-edit 142 in the text output field 130 become replaced with the letters of the intended word, as needed.

According to another embodiment of the invention, the character selection method 230 described above is used iteratively to specify series of characters from the ICS interface. In one embodiment, words and sentences are formed on the display 104 by iteratively selecting characters according to the method above, and the "Space" button in the plurality of function buttons 116 is used to input spaces between words on the display, as well as to disambiguate input, as needed.

Figure 9:
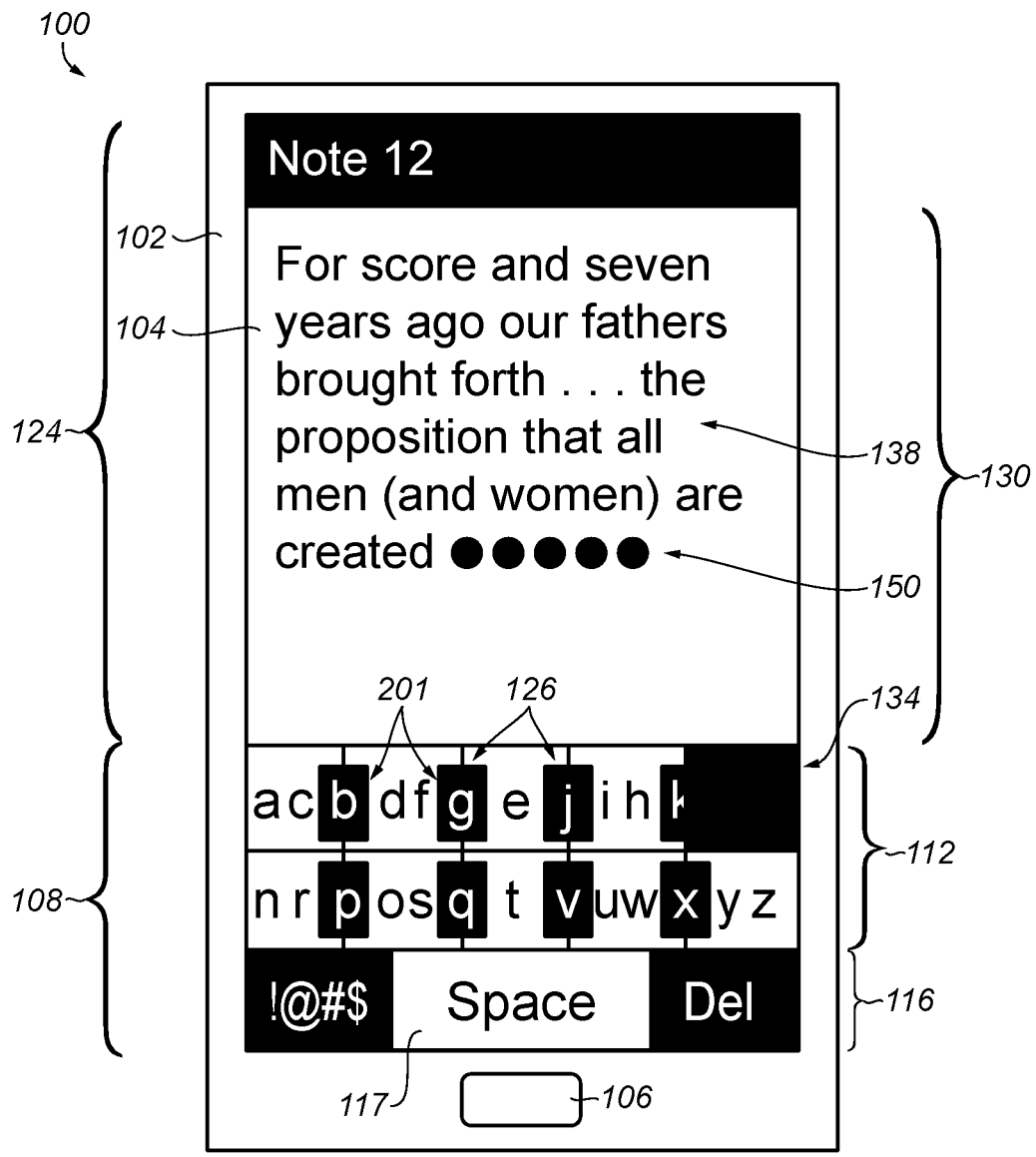
FIG. 9 is a schematic drawing of another embodiment of the electronic device.

FIG. 9 is another embodiment of the electronic device 100. The embodiment depicts a mobile phone or smartphone, but in other embodiments the electronic device could be a wearable device, game, TV controller, augmented/virtual reality system, portion of an automotive dashboard or any number of other electronic devices that require user input.

The electronic device 100 includes the case 102, the touch-sensitive display screen 104 and the "home" button 106. The case holds and mechanically supports the display screen and the "home" button. The screen and "home" button intersect the surface of the case and lie alongside one another on the surface of the case. The screen displays the user input interface 108 and the application program interface 124. In the embodiment of FIG. 9, the application program interface 124 occupies the screen's upper portion, and the input interface 108 occupies the screen's lower portion.

The user input interface 108 includes an interleaved character selection (ICS) interface 112 and the plurality of function buttons 116. The ICS interface and the plurality of function buttons lie adjacent to one another within the user input interface. The plurality of function buttons includes the "Space" button 117.

The application program interface 124 includes the text output field 130. The text output field is filled with text 138. The text 138 may include a sequence of tentative letter selection (TLS) indicators (also called generic actuation indicators) 150 that, in one embodiment, lie at the right-hand end of the bottom line of the text 138.

The application program interface 124 is communicatively coupled with a corresponding application program 474 stored on the device's storage medium 448. In a further embodiment, a user can change the application program interface 124 shown on the display screen 104 to the interface of one of a plurality of other application programs 474 stored in the storage medium 448 of the device 100.

As an example, the display screen of the embodiment of FIG. 9 shows the application interface 124 of a note-taking application.

In one embodiment of the device 100, the application interface 124 displays characters that a user selects by actuating buttons of the interleaved character selection (ICS) interface 112. Refer to International Patent Application No. PCT/US18/33542 for a description of one example embodiment of the ICS interface 112.

In one embodiment of FIG. 9, the primary buttons 120 are selectable with the tap actuation 134 (represented by a black box that superimposes the activated primary button). In a further embodiment, the interleaved buttons 126 are selectable with the unique selection gesture, which is defined as any input actuation except the tap. Refer to International Patent Application No. PCT/US18/33542, FIG. 19 or 51, for a description of example possible unique selection gestures, e.g., a long press or a tap-and-swipe according to various embodiments.

In the embodiment of FIG. 9, the tap actuation 134 also results in the display of one tentative letter selection (TLS) indicator 150 in the text field 130. In the event that the text field already displays one or more TLS indicators, then the actuation results in the TLS indicator becoming appended to a sequence of previously displayed TLS indicators 150.

The tentative letter selection (TLS) indicators fill the role that the word-under-edit fills in the embodiments of FIGS. 4-8. The indicators provide visual feedback in response to a button actuation. But, in comparison with the word-under-edit, TLS indicators solve the problem of deciding which letter to display when the intended letter of a button actuation is ambiguous—the problem described in the fourth view 168 of the progression 160 of FIGS. 5A and 5B. TLS indicators solve that by displaying a neutral symbol (i.e., not a letter), such as the dot shown in the embodiment of FIG. 9. In an alternative embodiment, the TLS indicator could be another shape, color or size, or any kind of symbol or placeholder.

In one application of the embodiment of FIG. 9, input received by the ICS interface 112 may be acquired and edited, in one non-limiting example, according to the algorithmic correction methods disclosed in International Patent Application No. PCT/US18/33542, FIGS. 53, 54 and 38. The methods of International Patent Application No. PCT/US18/33542, FIGS. 53, 54 and 38, return a word suggestion that is a minimum (or near minimum) number of letter edits from an acquired sequence of ambiguous candidate letter selections. In a further application of the embodiment of FIG. 9, the processor 444 replaces the sequence of tentative letter selection (TLS) indicators 150 with the word suggestion returned by the methods of International Patent Application No. PCT/US18/33542, FIGS. 53, 54 and 38.

In another application of the embodiment of FIG. 9, the ICS interface 112 receives input that is tap actuations only.

As such, the letters 201 of the interleaved buttons 126 are not selectable. In a further application of the embodiment of FIG. 9, the input received by the ICS interface 112 is acquired and edited, in one non-limiting example, according to the algorithmic correction methods disclosed in International Patent Application No. PCT/US18/33542, FIGS. 53, 54 and 38. Furthermore, the processor 444 replaces the sequence of tentative letter selection (TLS) indicators with the word suggestion returned by the correction algorithm. In one example of the application, the word suggestion includes one or more letters 201 assigned to the interleaved buttons 126. As a result, the letters 201 of the interleaved buttons 126 appear tap selectable to a user due to the fact that the letters 201 occur in the returned word that replaces the word-under-edit 142, even though those letters 201 are not selectable from the ICS interface 112 in the application where the user uses tap actuations only.

In a further embodiment, the least frequently used letters of the alphabet are assigned to the interleaved buttons 126. The embodiment of FIG. 9 enables English-language input, but in alternative embodiments the ICS interface 112 could enable input of letters of other languages.

Figure 10A:
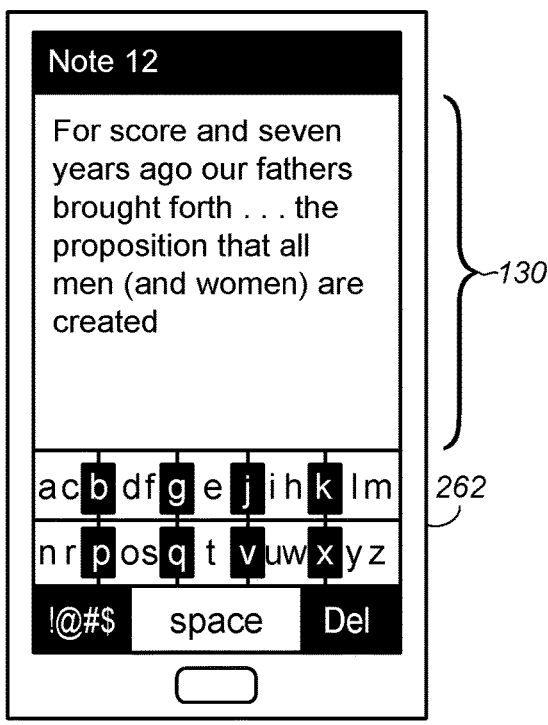
FIGS. 10A and 10B are a progression of views of another embodiment of the electronic device.
Figure 10A:
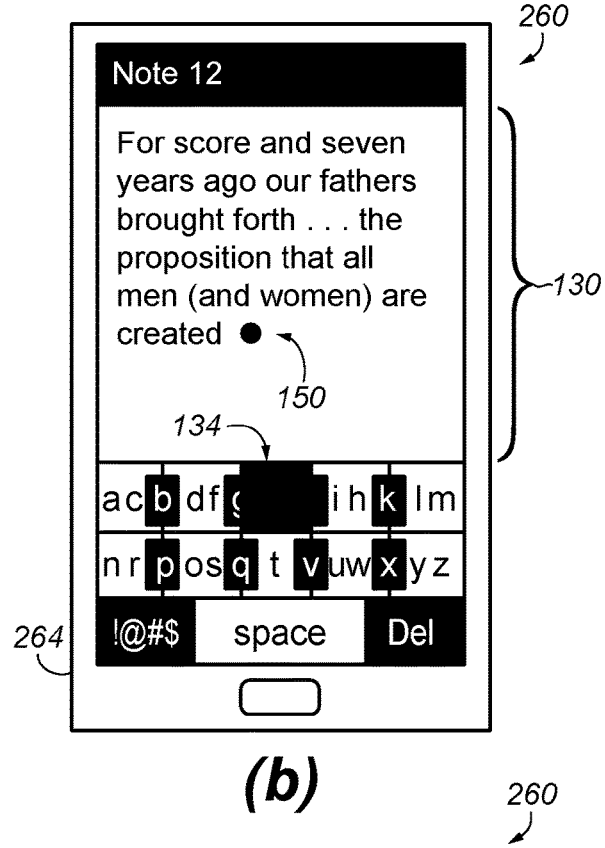
Figure 10A:
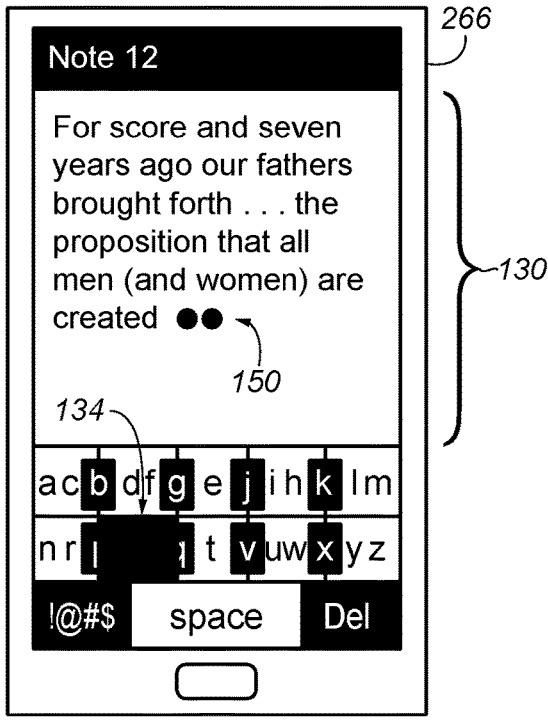
Figure 10A:
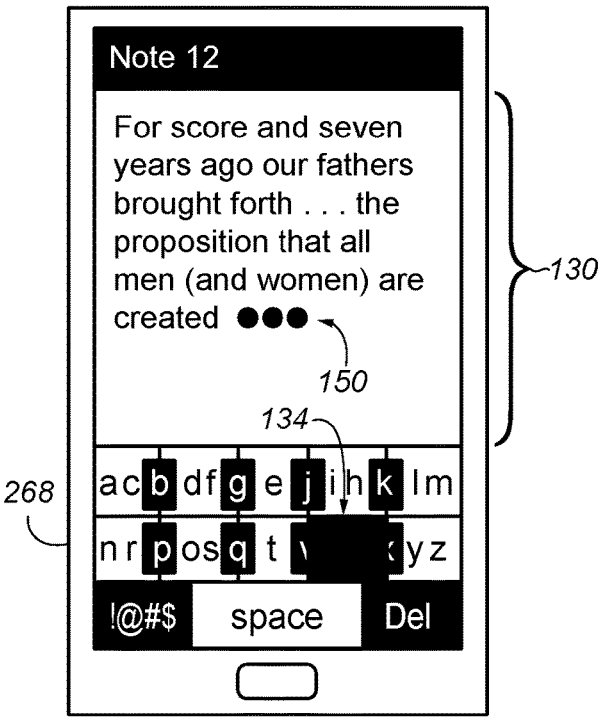
Figure 10B:
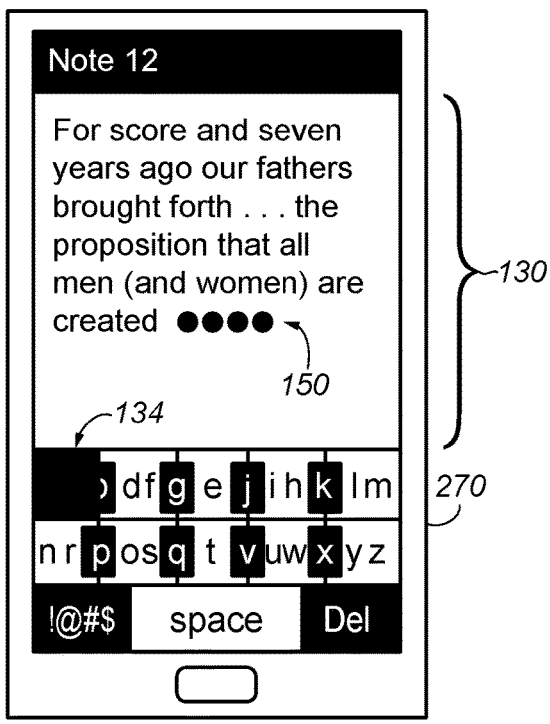
Figure 10B:
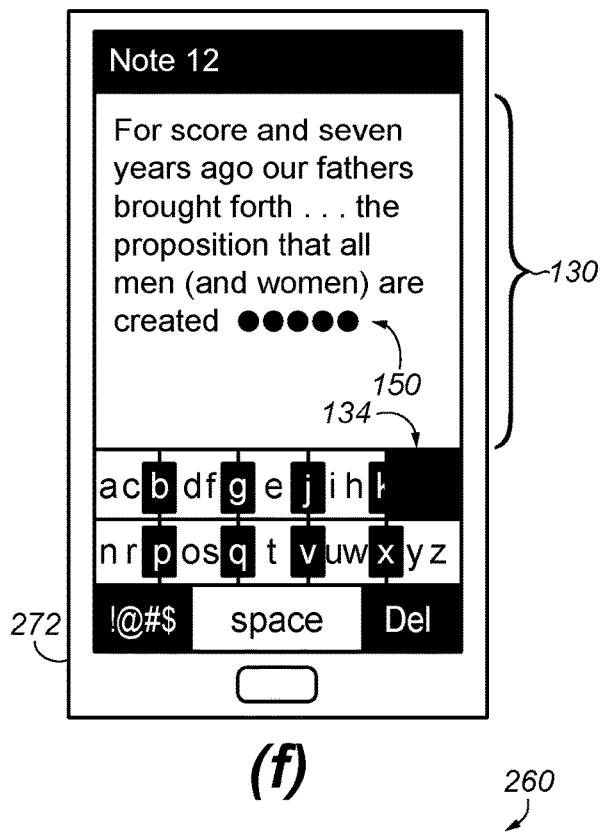
Figure 10B:
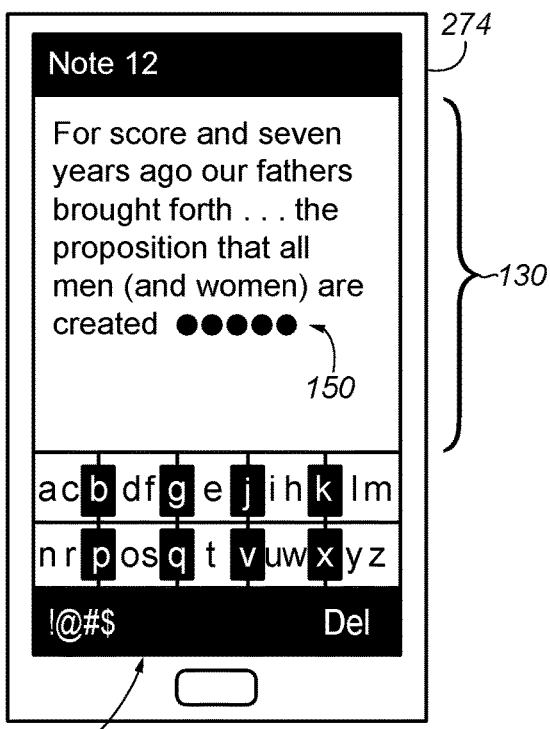
Figure 10B:
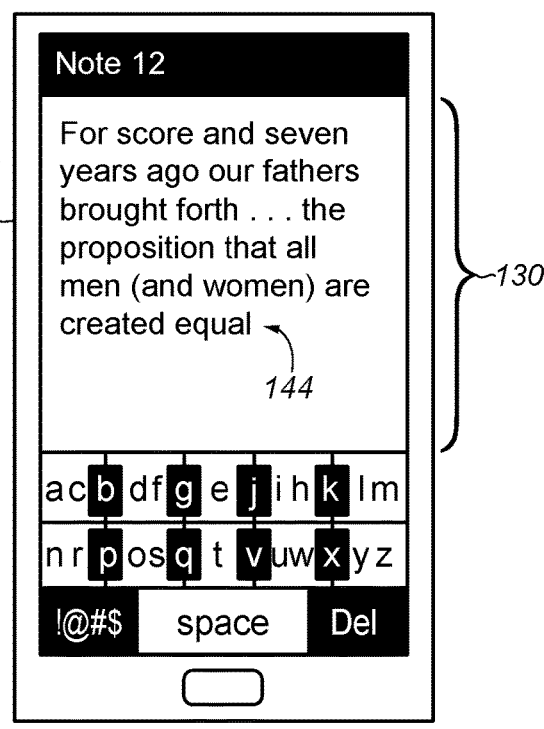

FIGS. 10A and 10B show a progression of views 260 of the device 100 of the embodiment of FIG. 9. Each view shows one in a series of steps whereby the letters of an example word become selected using, for example, the ICS interface 112 and displayed as output on the application interface 124. The progression uses the example word "equal", but clearly input of words other than "equal" are not outside the scope of the disclosure.

Note that conversion of the selections of the ICS interface 112 to the displayed output includes building a unit string and appending the unit string to a received sequence variable, in one non-limiting example, according to the method of International Patent Application No. PCT/US18/33542, FIG. 53. For the sake of clarity, it is understood that each button actuation 134 may trigger the steps of the method of PCT/US18/33542, FIG. 53.

Note that in this example, primary buttons are actuated with taps, and interleaved buttons with unique selection gestures, as described in the embodiment of FIG. 9.

In a first view 262 of the progression 260, the final word of the text in the text field 130 is the word "created". In a second view 264 of the progression, the actuation 134 of the primary button that is assigned the letter "e" occurs. As a result, the text field 130 additionally displays one tentative letter selection (TLS) indicator 150 after the word "created" in the final line of text.

In a third view 266 of the progression, the actuation 134 of the primary button that is assigned the letter "o s" occurs. As a result, the text field 130 displays an additional TLS indicator 150, which is appended to the TLS indicator displayed in the view 260. In an alternative embodiment, a user—who for this actuation intends to select the letter "q"—could have actuated the primary button assigned the letter "t", which displays the additional TLS indicator 150.

In a fourth view 268 of the progression, the actuation 134 of the primary button that is assigned the letter "u w" occurs. As a result, the text field 130 displays an additional TLS indicator 150, which is appended to the two TLS indicators previously displayed.

In a fifth view 270 of the progression, the actuation 134 of the primary button that is assigned the letter "a c" occurs. As a result, the text field 130 displays an additional TLS indicator 150, which is again appended. In a sixth view 272 of the progression 260, the actuation 134 of the primary button that is assigned the letter "l m" occurs. As a result, the text field 130 displays an additional appended TLS indicator 150 that is again appended.

In a seventh view 274 of the progression, a "Space" actuation 136 occurs (represented by a black box that covers the "Space" button 117). In one embodiment of the progression 260, the "Space" actuation triggers 136 the received sequence disambiguator 470 to disambiguate the sequence of unit strings stored in the received sequence variable, in one non-limiting example, according to the methods of International Patent Application No. PCT/US18/33542, FIGS. 54 and 38. In an alternative embodiment, an actuation of a button other than the "Space" actuation triggers the received sequence disambiguator 470 to disambiguate. In yet another embodiment, the device 100 itself triggers the received sequence disambiguator 470 to disambiguate, in response to an event or expiration of a pre-determined elapsed time period.

In an eighth view 276 of the progression, the received sequence disambiguator 470 returns the word suggestion. In a further embodiment, the graphics engine 442 updates the display 104 by replacing the sequence of tentative selection (TLS) indicators 150 with the word suggestion 144. For the example of FIGS. 10A and 10B, the word suggestion 144 is "equal".

Although the progression of views of FIGS. 10A and 10B is one embodiment of steps for inputting characters using the embodiment of the device 100 of FIG. 9, the scope of the method is not limited by this particular example or embodiment, but rather by the scope of the claims.

Figure 11:
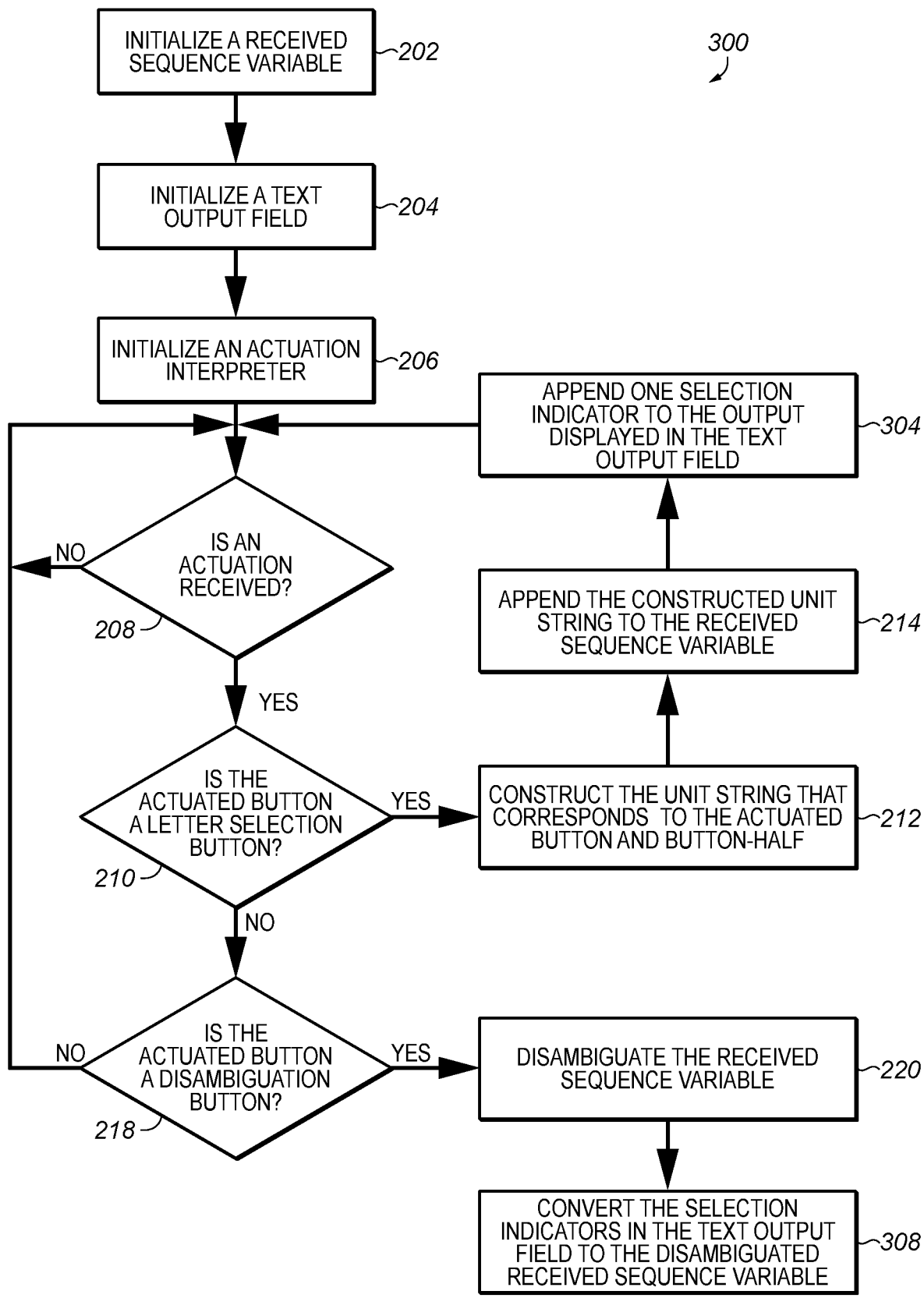
FIG. 11 is flowchart of another embodiment of a method for a processor of an electronic device to interpret character selections.

FIG. 11 shows a flowchart of an embodiment of a method 300 for the processor 444 of the electronic device 100 to interpret character selections.

In a step 202 of the method 200, the processor 444 initializes a received sequence variable. In a step 204 of method 200, the processor 444 initializes the text output field 130. In a step 206, the processor 444 initializes the actuation interpreter 466. In a step 208, the processor monitors the ICS interface 112 for a button actuation. Once a first actuation occurs, in a step 210, the actuation interpreter 466 determines if the button actuated is one of the letter selection buttons.

If in the step 210 the actuation interpreter 466 determines the button actuated is one of the letter selection buttons, in subsequent steps 212 and 214 the actuation interpreter constructs the unit string that corresponds to the actuated button and button-half and appends the constructed unit string to the received sequence variable, in one non-limiting example, according to the process described in and shown in FIG. 53 of International Patent Application No. PCT/US18/33542. Furthermore, in a subsequent step 304, the processor 444 appends the tentative letter selection (TLS) indicator (also called the generic actuation indicator) to the text 138 displayed in the text output field 130.

If in the step 210 the actuation interpreter 466 determines the button actuated is not one of the letter selection buttons, in a subsequent step 218 the actuation interpreter determines if the button actuated is the disambiguation button. In one embodiment the disambiguation button is the "Space" button.

If in the step 218, the actuation interpreter determines the button actuated is not the disambiguation button, the actuation may not have been related to a letter selection and is disregarded.

If in the step 218, the actuation interpreter determines the button actuated is the disambiguation button (which in one embodiment is the "Space" button), in the step 220 the received sequence disambiguator 470 disambiguates the sequence of appended unit strings stored in the received sequence variable in one non-limiting example, according to the process described in and shown in International Patent Application No. PCT/US18/33542, FIGS. 54 and 38. Furthermore, in a final step 308, the processor 444 replaces the tentative letter selection (TLS) indicators 150 in the text output field 130 with the letters of the disambiguated received sequence yielded by the step 220.

According to a further embodiment of the invention, the processor 444 executes the method 300 iteratively. Although method 300 of FIG. 11 is one embodiment of a method for interpreting words from actuations of buttons of the ICS interface 112, the scope of the method is not limited by this particular embodiment, but rather by the scope of the claims.

Figure 12:
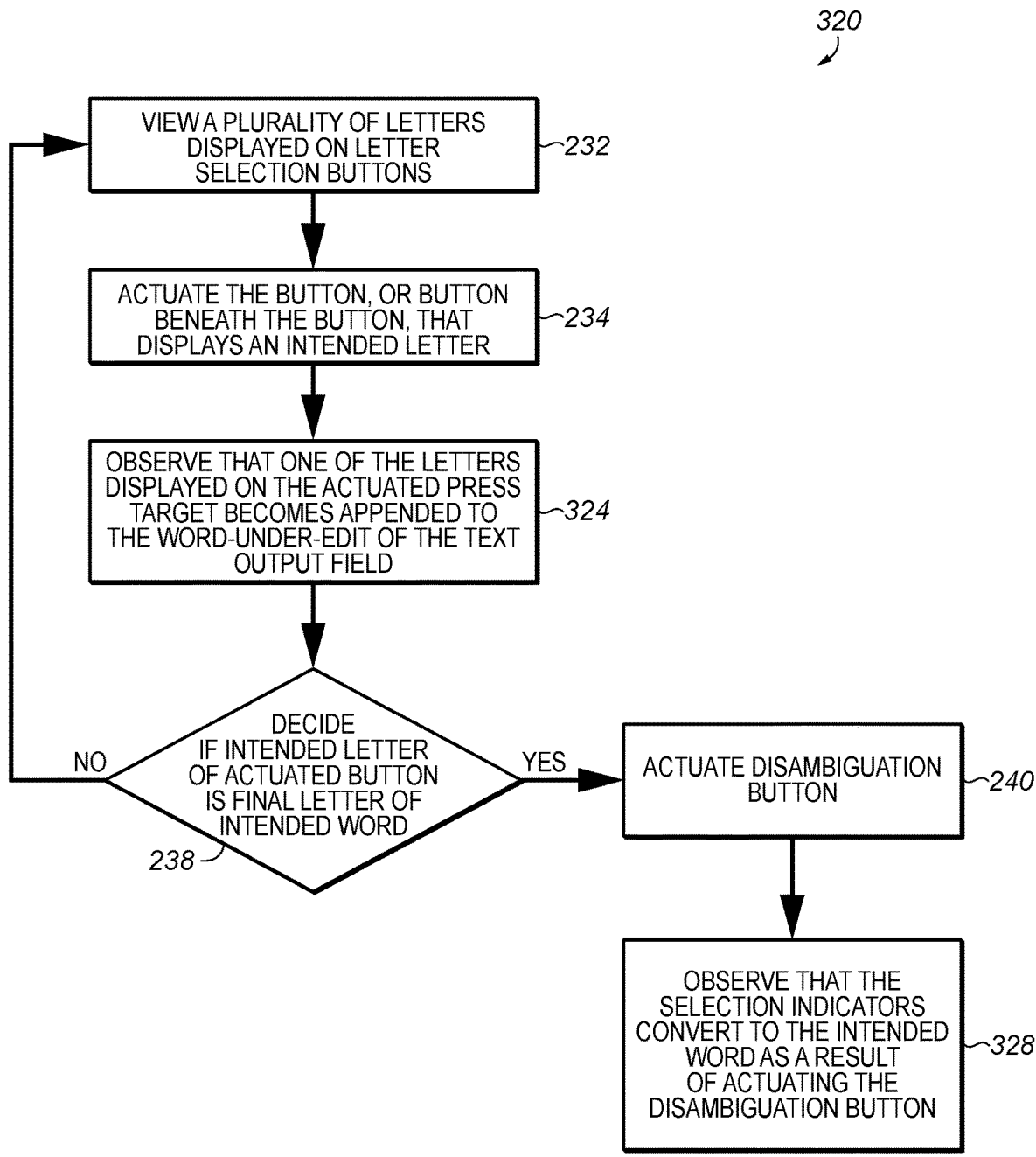
FIG. 12 is flowchart of another embodiment of a method for a user to input characters to an embodiment of the electronic device.

FIG. 12 shows a flowchart of an embodiment of a method 320 for a user to input characters to the electronic device 100.

In the step 232 of the method 320, a user views the characters of the ICS interface 112. In the step 234, the user actuates the button that displays the intended character or the button beneath the button that displays the intended character.

In a step 324, the user observes that one tentative letter selection (TLS) indicator 150 becomes appended to the text 138 of the text output field 130.

In the step 238, the user decides if the intended letter of the actuated button is the final letter of the user's intended word. If the intended letter of the actuated button is not the final letter of the user's intended word, then in the step 232 the user views the characters of the ICS interface in search of the next intended letter, and repeats the steps of the method 320.

If in the step 238 the user decides the intended letter of the actuated button is the final letter of the user's intended word, then in the step 240 the user actuates the disambiguation button, which in one embodiment is the "Space" button of the user input interface 108. In a final step 328 of the method 320, the user observes that the one or more appended tentative letter selection (TLS) indicators 150 in the text output field 130 become replaced with the letters of the intended word.

According to another embodiment of the invention, the character selection method 320 described above is used iteratively to specify series of characters from the ICS interface. In one embodiment, words and sentences are formed on the display 104 by iteratively selecting characters according to the method above, and the "Space" button in the plurality of function buttons 116 is used to input spaces between words on the display as well as disambiguate input, as needed.

Figure 13:
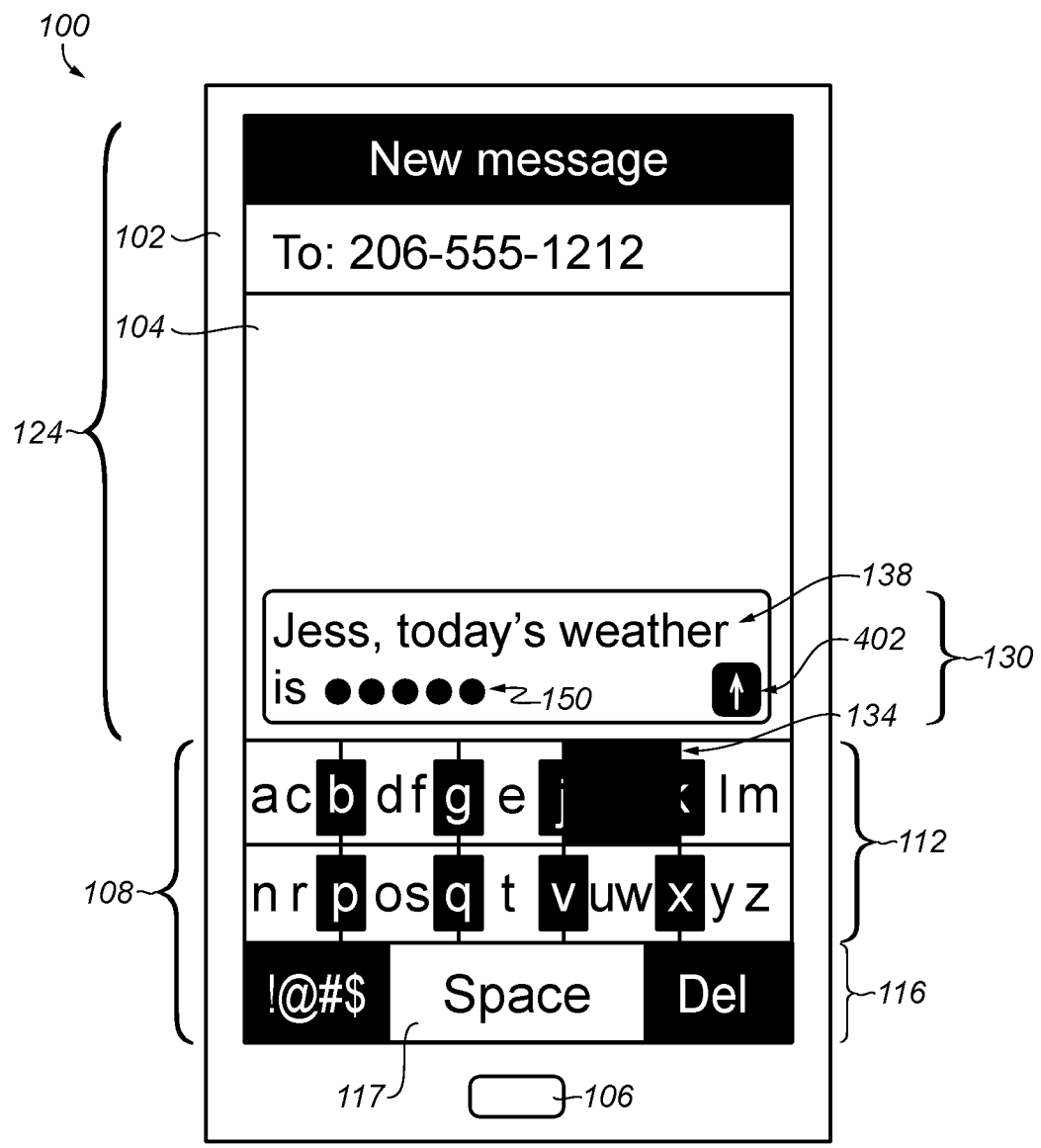
FIG. 13 is a schematic drawing of yet another embodiment of the electronic device.

FIG. 13 is another embodiment of the electronic device 100. The embodiment depicts a mobile phone or smartphone, but in other embodiments the electronic device could be a wearable device, game, TV controller, augmented/virtual reality system, portion of an automotive dashboard or any number of other electronic devices that require user input.

The electronic device 100 includes the case 102, the touch-sensitive display screen 104 and the "home" button 106. The case holds and mechanically supports the display screen and the "home" button. The screen and "home" button intersect the surface of the case and lie alongside one another on the surface of the case. The screen displays the user input interface 108 and the application program interface 124. In the embodiment of FIG. 13, the application program interface 124 occupies the screen's upper portion, and the input interface 108 occupies the screen's lower portion.

The user input interface 108 includes an interleaved character selection (ICS) interface 112 and the plurality of function buttons 116. The ICS interface and the plurality of function buttons lie adjacent to one another within the user input interface. The plurality of function buttons includes the "Space" button 117.

The application program interface 124 includes the text output field 130. The text output field is filled with text 138. The text 138 may include a sequence of tentative letter selection (TLS) indicators (also called generic actuation indicators) 150 that, in one embodiment, lie at the right-hand end of the bottom line of the text 138. The application program interface 124 further includes a "Send" button 402. In one embodiment, the "Send" button is configured such that on action, the electronic device 100 transmits the text 138 of the text output field 130 to another electronic device 100 via a communication network.

The application program interface 124 is communicatively coupled with a corresponding application program 474 stored on the device's storage medium 448. In a further embodiment, a user can change the application program interface 124 shown on the display screen 104 to the interface of one of a plurality of other application programs 474 stored in the storage medium 448 of the device 100.

As an example, the display screen of the embodiment of FIG. 13 shows the application interface 124 of a mobile messaging application.

In one embodiment of the device 100, the application interface 124 displays characters that a user selects by actuating buttons of the interleaved character selection (ICS) interface 112. Refer to PCT/US18/33542 for a description of one example embodiment of the ICS interface 112.

In one embodiment of FIG. 13, the primary buttons 120 are selectable with the tap actuation 134 (represented by the black box that superimposes the activated primary button). In a further embodiment, the interleaved buttons 126 are selectable with the unique selection gesture, which is defined as any input actuation except the tap. Refer to PCT/US18/33542, FIG. 19 or 51, for a description of example possible unique selection gestures, e.g., a long press or a tap-and-swipe.

In the embodiment of FIG. 13, the tap actuation 134 also results in the display of one tentative letter selection (TLS) indicator 150 in the text field 130. In the event that the text field already displays one or more TLS indicators, then the actuation results in the TLS indicator becoming appended to the sequence of previously displayed TLS indicators 150.

The tentative letter selection (TLS) indicators fill the role that the word-under-edit fills in the embodiments of FIGS. 4-8. The indicators provide visual feedback in response to a button actuation. But, in comparison with the word-under-edit, TLS indicators solve the problem of deciding which letter to display when the intended letter of a button actuation is ambiguous—the problem described in the fourth view 168 of the progression 160 of FIGS. 5A and 5B. TLS indicators solve that by displaying a neutral symbol (i.e., not a letter), such as the dot shown in the embodiment of FIG. 13. In an alternative embodiment, the TLS indicator could be another shape, color or size, or any kind of symbol or placeholder.

In one application of the embodiment of FIG. 13, input received by the ICS interface 112 is acquired and edited according to the algorithmic correction methods disclosed in International Patent Application No. PCT/US18/33542, FIGS. 53, 54 and 38. The methods of PCT/US18/33542, FIGS. 53, 54 and 38, return a word suggestion that is a minimum (or near minimum) number of letter edits from an acquired sequence of candidate letter selections. In a further application of the embodiment of FIG. 13, the processor 444 replaces the sequence of tentative letter selection (TLS) indicators 150 with the word suggestion returned by the methods of International Patent Application No. PCT/US18/33542, FIGS. 53, 54 and 38.

In another application of the embodiment of FIG. 13, the ICS interface 112 receives input that is tap actuations only. As such, the letters 201 of the interleaved buttons 126 are not selectable. In a further application of the embodiment of FIG. 13, the input received by the ICS interface 112 is acquired and edited, in one non-limiting example, according to the algorithmic correction methods disclosed in International Patent Application No. PCT/US18/33542, FIGS. 53, 54 and 38. Furthermore, the processor 444 replaces the sequence of tentative letter selection (TLS) indicators with the word suggestion returned by the correction algorithm. In one example of the application, the word suggestion includes one or more letters 201 assigned to the interleaved buttons 126. As a result, the letters 201 of the interleaved buttons 126 appear tap selectable to a user due to the fact that the letters 201 occur in the returned word that replaces the word-under-edit 142, even though those letters 201 are not selectable from the ICS interface 112 in the application where the user uses tap actuations only.

In a further embodiment, the least frequently used letters are assigned to the interleaved buttons 126. The embodiment of FIG. 13 enables English-language input, but in alternative embodiments the ICS interface 112 could enable input of letters of other languages.

Figure 14A:
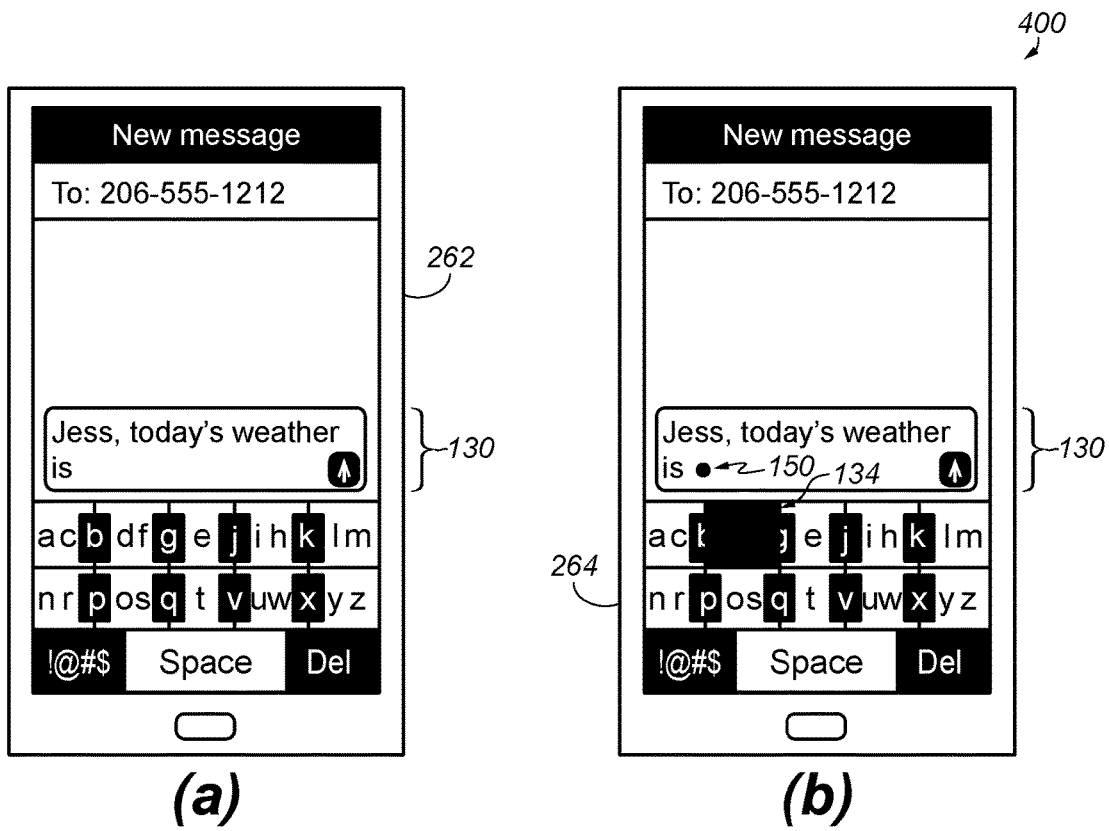
FIGS. 14A, 14B and 14C are a progression of views of yet another embodiment of the electronic device.
Figure 14A:
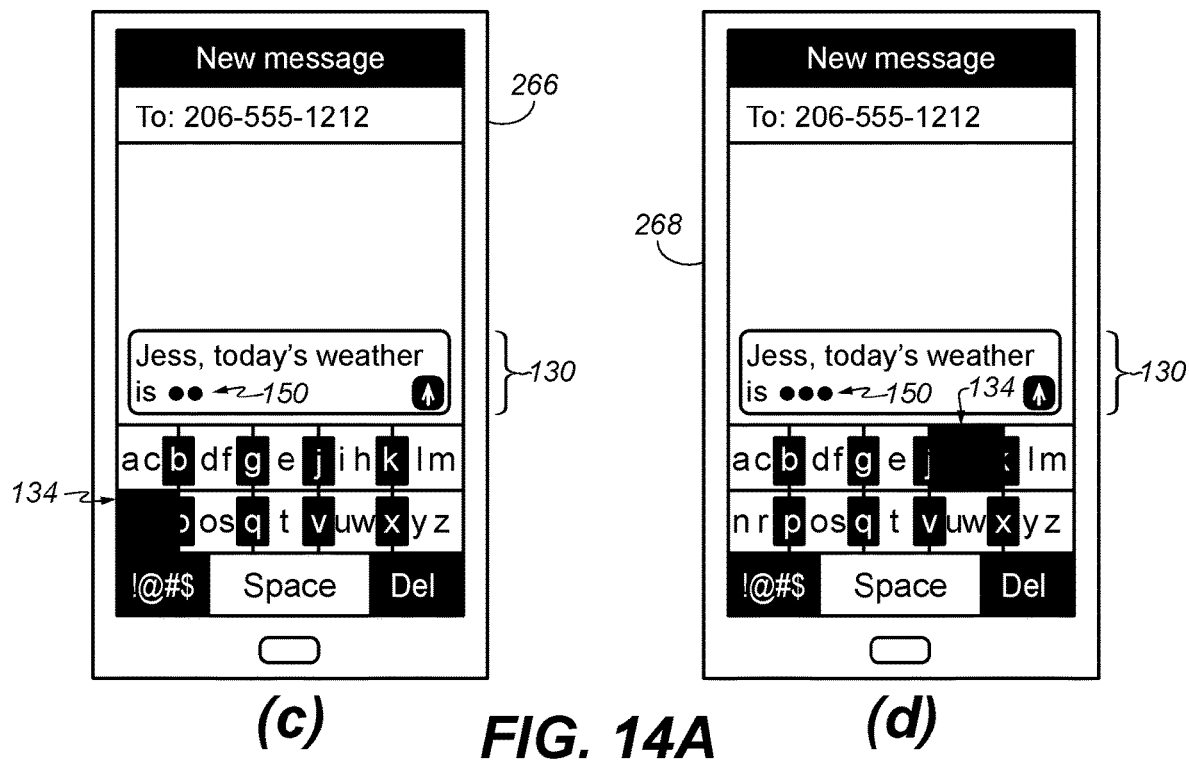
Figure 14B:
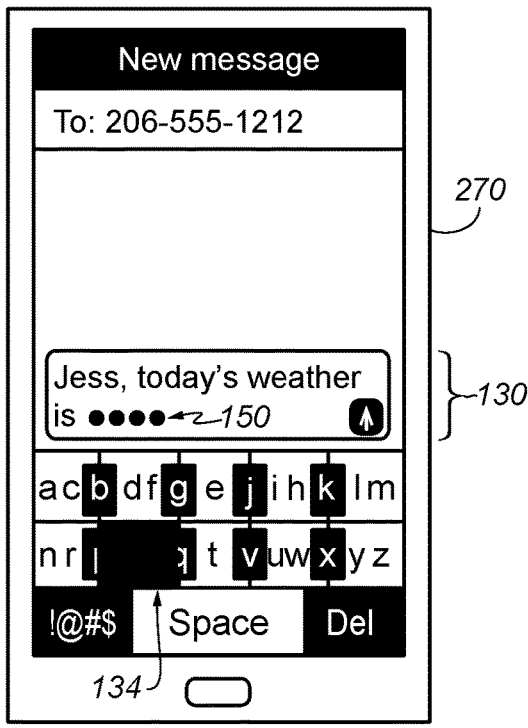
Figure 14B:
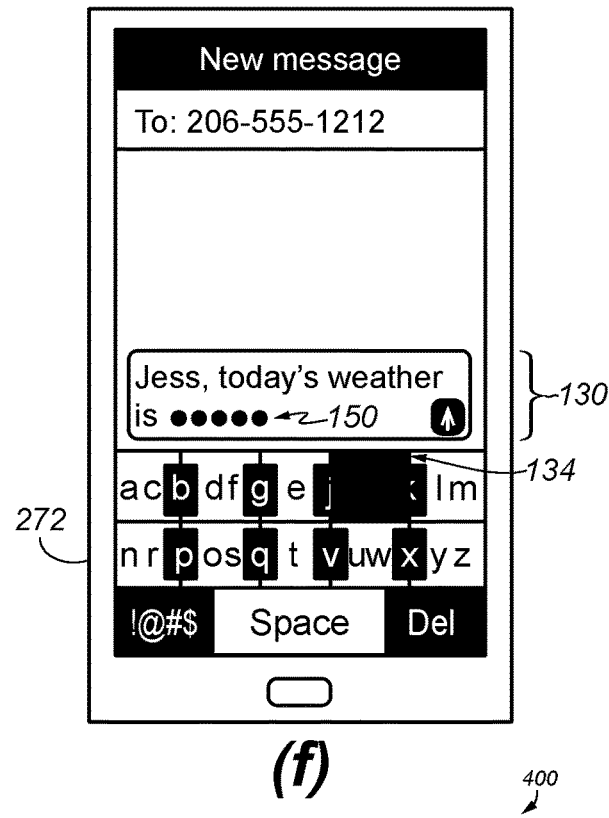
Figure 14B:
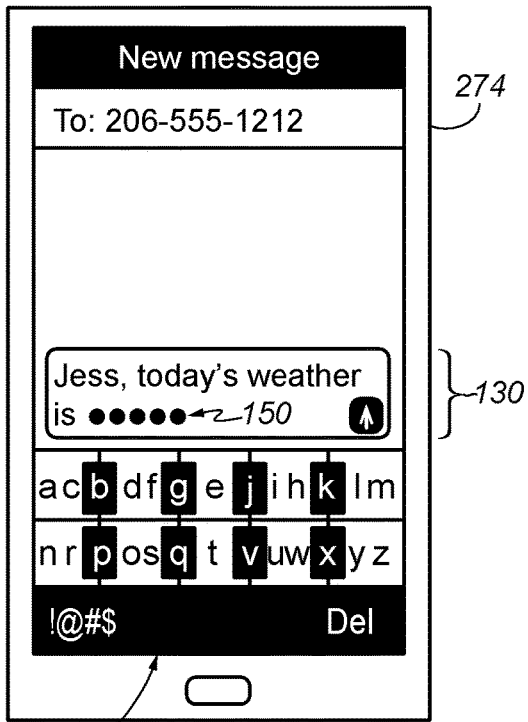
Figure 14B:
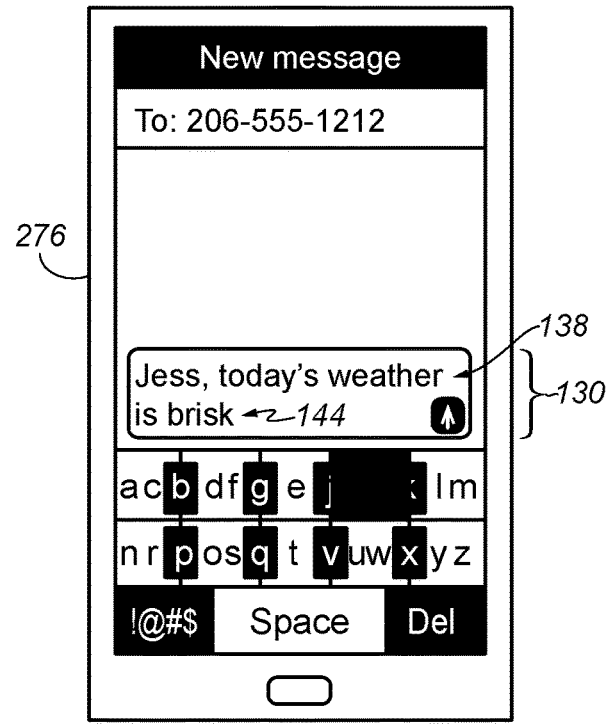
Figure 14C:
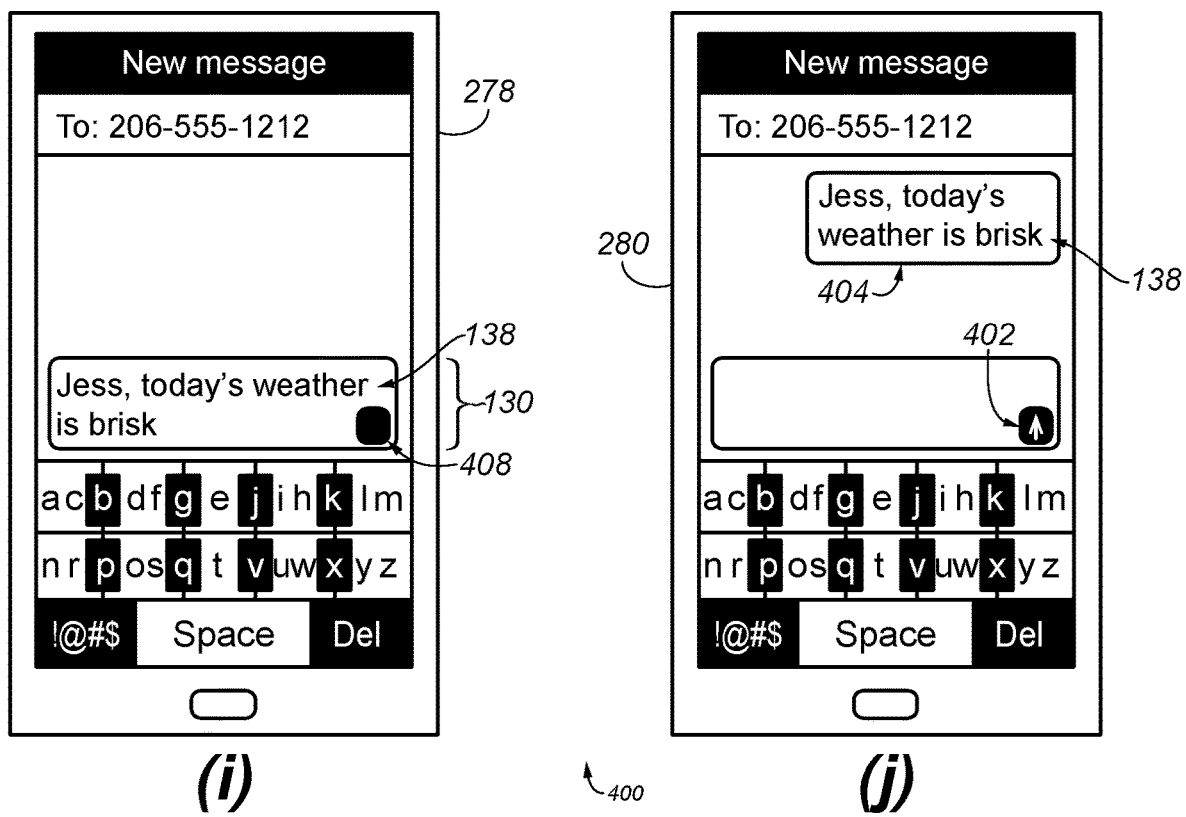

FIGS. 14A, 14B and 14C show a progression of views 400 of the device 100 of the embodiment of FIG. 13. Each view shows one in a series of steps whereby the letters of an example word become selected using the ICS interface 112 and displayed as output on the application interface 124. The progression uses the example word "brisk", but clearly input of words other than "brisk" are not outside the scope of the disclosure.

Note that conversion of the selections of the ICS interface 112 to the displayed output includes building a unit string and appending the unit string to a received sequence variable, according, in one non-limiting example, to the method of International Patent Application No. PCT/US18/33542, FIG. 53. For the sake of clarity, it is understood that each button actuation 134 may trigger the steps of the method of PCT/US18/33542, FIG. 53.

Note that in this example, primary buttons are actuated with taps, and interleaved buttons with unique selection gestures, as described in the embodiment of FIG. 13.

In a first view 262 of the progression 400, the final word of the text in the text field 130 is the word "is". In a second view 264 of the progression, the actuation 134 of the primary button that is assigned the letters "d f" occurs. As a result, the text field 130 additionally displays one tentative letter selection (TLS) indicator 150 after the word "is" in the final line of text. In an alternative embodiment, a user—who for this actuation intends to select the letter "b"—could have actuated the primary button assigned the letters "a c", which also displays the additional TLS indicator 150.

In a third view 266 of the progression, the actuation 134 of the primary button that is assigned the letters "n r" occurs. As a result, the text field 130 displays an additional TLS indicator 150, which is appended to the TLS indicator first displayed in the view 264.

In a fourth view 268 of the progression, the actuation 134 of the primary button that is assigned the letters "i h" occurs. As a result, the text field 130 displays an additional TLS indicator 150, which is appended to the two previously displayed.

In a fifth view 270 of the progression, the actuation 134 of the primary button that is assigned the letters "o s" occurs. As a result, the text field 130 displays an additional TLS indicator 150, which is again appended. In a sixth view 272 of the progression 400, the actuation 134 of the primary button that is assigned the letters "i h" occurs. As a result, the text field 130 displays an additional appended TLS indicator 150. In an alternative embodiment, a user—who for this actuation intends to select the letter "k"—could have actuated the primary button assigned the letters "l m", which also appends the additional TLS indicator to the sequence of previously displayed TLS indicators 150.

In a seventh view 274 of the progression, a "Space" actuation 136 occurs (represented by a black box that covers the "Space" button 117). In one embodiment of the progression 260, the "Space" actuation triggers 136 the received sequence disambiguator 470 to disambiguate the sequence of unit strings stored in the received sequence variable, in one non-limiting example, according to the methods of International Patent Application No. PCT/US18/33542, FIGS. 54 and 38. In an alternative embodiment, an actuation of a button other than the "Space" actuation triggers the received sequence disambiguator 470 to disambiguate. In yet another embodiment, the device 100 itself triggers the received sequence disambiguator 470 to disambiguate, in response to an event or expiration of a pre-determined elapsed time period.

In an eighth view 276 of the progression, the received sequence disambiguator 470 returns the word suggestion. In a further embodiment, the graphics engine 442 updates the text output field 130 by replacing the sequence of tentative letter selection (TLS) indicators 150 with the returned word suggestion 144. For the example of FIGS. 14A, 14B and 14C, the word suggestion 144 is "brisk".

In a ninth view 278 of the progression, a "Send" actuation 408 of the "Send" button 402 occurs (represented by a black square that covers the "Send" button). As a result, in one embodiment the text 138 of the text output field 130, or a digital representation of the text 138, becomes transmitted to the electronic device of a recipient via the communication network.

In a tenth view 280, the text 138 of the transmission is displayed in an outgoing message log 404 that, in one embodiment, displays messages sent and received by the device 100.

Although the progression of views of FIGS. 14A, 14B and 14C is one embodiment of steps for inputting characters, composing words and messages, and transmitting the messages using the embodiment of the device 100 of FIG. 13, the scope of the method is not limited by this particular embodiment, but rather by the scope of the claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

This application hereby incorporates by reference in their entireties International Application No. PCT/US18/33542, filed May 18, 2018; U.S. Application No. 62/508,910, filed May 19, 2017; U.S. application Ser. No. 15/274,577, filed Sep. 23, 2016; U.S. Application No. 62/276,729, filed Jan. 8, 2016; U.S. Application No. 62/318,125, filed Apr. 4, 2016 and U.S. Application No. 62/334,702, filed May 11, 2016.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus, comprising:
at least one computer processor; and
at least one non-transitory computer memory coupled to the at least one computer processor, the at least one non-transitory computer memory having computer-executable instructions stored thereon that, when executed by the at least one computer processor, cause the at least one computer processor to:
generate an interactive graphical user interface including:
at least three selection buttons arranged contiguously in a first row on the interactive graphical user interface, each selection button composed of two halves with each halve of at least two of the at least three selection buttons assigned a different letter;
at least three interleaved buttons collinear with the first row of selection buttons, each interleaved button overlapping one of the halves of each of two selection buttons of the row and assigned a different letter than the halves of each of the two selection buttons of the row that are overlapped by the interleaved button; and
a field of letter output positions on the interactive graphical user interface;
record, for each selection button actuation, the identity of the actuated:
selection button; and
selection button halve; and
display, for each selection button actuation, a generic actuation indicator in one letter output position of the field.

2. The apparatus of claim 1 wherein the interactive graphical user interface further includes:
an additional at least three selection buttons arranged contiguously in a second row on the interface; and
an additional at least three interleaved buttons collinear with the second row of the at least three selection buttons, wherein the first row and the second row lie parallel to one another on the interface.

3. The apparatus of claim 1 wherein the computer-executable instructions further cause the at least one computer processor to replace a sequence of displayed generic actuation indicators with letters, wherein, for each indicator of the sequence, the letter that replaces the indicator is among the letters assigned to:
the selection button whose actuation yielded the indicator; and
the interleaved button that overlaps the actuated halve of: the selection button whose actuation yielded the indicator.

4. A computer processor-implemented method comprising:
recording, by at least one computer processor,
a first data value in response to a selection button actuation; and
a second data value in response to the selection button actuation; wherein:
the first data value uniquely identifies an actuated selection button from among at least three selection buttons arranged contiguously in a row on a graphical user interface with at least three interleaved buttons; and
the second data value uniquely identifies a selection button halve from among two halves that compose the actuated selection button;
each halve of each of the at least three selection buttons of the row is assigned a letter; and
for each of at least two of the at least three selection buttons, the letters assigned to the halves are different; and
displaying, by at least one computer processor, a generic actuation indicator in a text output field on the graphical user interface in response to the selection button actuation.

5. The computer-processor implemented method of claim 4 further comprising:
replacing, by at least one computer processor, a sequence of displayed generic actuation indicators with letters, wherein for each indicator of the sequence, the letter that replaces the indicator is among the letters assigned to
the selection button whose actuation yielded the indicator.

6. The computer-processor implemented method of claim 5 wherein the letters that replace the sequence of displayed generic actuation indicators are a word.

7. The method of claim 5 wherein, for each indicator of the sequence, the letters that are among the letters that replace the indicator further include the letter assigned to the interleaved button that overlaps the actuated halve of: the selection button whose actuation yielded the indicator.

8. A non-transitory computer storage medium having computer-executable instructions stored thereon that, when executed by at least one processor, cause the at least one processor to:
generate an interactive graphical user interface including:
at least three selection buttons arranged contiguously in a first row on the interactive graphical user interface, each selection button composed of two halves with each halve of at least two of the at least three selection buttons assigned a different letter;
at least three interleaved buttons collinear with the first row of selection buttons, each interleaved button overlapping one of the halves of each of two selection buttons of the row and assigned a different letter than the halves of each of the two selection buttons of the row that are overlapped by the interleaved button; and
a field of letter output positions on the interactive graphical user interface;
record, for each selection button actuation, the identity of the actuated:
selection button; and
selection button halve; and
display, for each selection button actuation, a generic actuation indicator in one letter output position of the field.

9. The apparatus of claim 8 wherein the computer-executable instructions further cause the at least one computer processor to replace a sequence of displayed generic actuation indicators with letters, wherein, for each indicator of the sequence, the letter that replaces the indicator is among the letters assigned to:
- the selection button whose actuation yielded the indicator; and
- the interleaved button that overlaps the actuated halve of:
  - the selection button whose actuation yielded the indicator.

10. The non-transitory computer storage medium of claim 8 wherein the generated interactive graphical user interface further includes:
- an additional at least three selection buttons arranged contiguously in a second row on the interface; and
- an additional at least three interleaved buttons collinear with the second row of the at least three selection buttons, wherein the first row and the second row lie parallel to one another on the interface.

* * * * *